United States Patent
Durairaj et al.

(10) Patent No.: US 7,700,687 B2
(45) Date of Patent: Apr. 20, 2010

(54) RESORCINOL RESIN-BLOCKED ISOCYANATES AND THEIR APPLICATIONS

(75) Inventors: Raj B. Durairaj, Monroeville, PA (US); Gary A. Jesionowski, Pittsburgh, PA (US); Mark A. Lawrence, Murrysville, PA (US)

(73) Assignee: INDSPEC Chemical Corporation, Pittsburgh, PA (US)

( * ) Notice: Subject to any disclaimer, the term of this patent is extended or adjusted under 35 U.S.C. 154(b) by 605 days.

(21) Appl. No.: 11/564,750

(22) Filed: Nov. 29, 2006

(65) Prior Publication Data

US 2007/0219306 A1    Sep. 20, 2007

Related U.S. Application Data

(60) Provisional application No. 60/779,342, filed on Mar. 3, 2006.

(51) Int. Cl.
C08G 18/08 (2006.01)

(52) U.S. Cl. .................................... 524/589

(58) Field of Classification Search .................. 524/589
See application file for complete search history.

(56) References Cited

U.S. PATENT DOCUMENTS

| | | | |
|---|---|---|---|
| 2,994,671 A | 8/1961 | Thompson |
| 3,226,276 A | 12/1965 | Rye |
| 3,268,467 A | 8/1966 | Rye |
| 3,307,966 A | 3/1967 | Shoaf |
| 3,431,241 A | 3/1969 | Moult |
| 3,433,768 A | 3/1969 | Muhlberger |
| 3,933,677 A | 1/1976 | Aufdermarsh, Jr. |
| 3,997,592 A | 12/1976 | Aufdermarsh, Jr. |
| 4,031,288 A | 6/1977 | Bhakuni et al. |
| 4,444,845 A | 4/1984 | Dunwald |
| 5,296,160 A | 3/1994 | Tirpak et al. |
| 5,436,279 A | 7/1995 | Grundke et al. |
| 5,470,945 A | 11/1995 | Markle et al. |
| 5,624,765 A | 4/1997 | Toukairin et al. |
| 5,889,125 A | 3/1999 | Toukairin et al. |
| 6,051,674 A | 4/2000 | Yezrielev et al. |
| 2003/0232915 A1 | 12/2003 | Corvasce et al. |
| 2005/0165192 A1 | 7/2005 | Rosen et al. |

FOREIGN PATENT DOCUMENTS

| | | |
|---|---|---|
| EP | 0 452 110 A1 | 10/1991 |
| EP | 1371 680 A1 | 12/2003 |
| GB | 975 377 | 11/1964 |
| GB | 1 349 740 | 4/1974 |
| JP | 2005/330626 | 12/2005 |

OTHER PUBLICATIONS

Zeno W. Wicks, Blocked Isocyanates, Progress in Organic Coatings, vol. 3 (1975), 73-99, Elsevier Sequoia S.A., Lausanne, Netherlands.
PCT Notification of Transmittal of the International Preliminary Report of PCT/US06/061353, mailed on Dec. 11, 2007.
International Search Report of PCT/US06/061353, mailed on Dec. 11, 2007.
Written Opinion of the International Searching Authority for PCT/US06/061353, mailed on Dec. 11, 2007.

*Primary Examiner*—Edward J Cain

(57) ABSTRACT

Resorcinol resin-blocked isocyanate compositions are derived from the reaction between a resorcinol resin and at least two different isocyanate compounds. The resorcinol resin-blocked isocyanate compositions may have two or more unblocking temperatures and/or melting characteristics that may provide some unique properties, such as improved adhesion of reinforcing materials to rubber compounds. The resorcinol resin-blocked isocyanate compositions can be used in fabric dipping formulations and/or rubber compositions with improved properties.

45 Claims, 2 Drawing Sheets

RESORCINOL RESIN-BLOCKED ISOCYANATES AND THEIR APPLICATIONS

PRIOR RELATED APPLICATIONS

This application claims priority to U.S. Provisional Application No. 60/779,342, filed Mar. 3, 2006. For purposes of United States patent practice, the contents of the provisional application are herein incorporated by reference in their entirety.

FEDERALLY SPONSORED RESEARCH STATEMENT

Not applicable.

REFERENCE TO MICROFICHE APPENDIX

Not applicable.

FIELD OF THE INVENTION

This invention relates to resorcinol resin-blocked isocyanate compositions comprising at least a reaction product derived from the reaction between a resorcinol resin and at least two different isocyanate compounds, methods for their synthesis and applications thereof, particularly their applications in rubber compound formulations and fabric dipping formulations for treating fibers, filaments, fabrics or cords to enhance their adhesion to rubber compounds.

BACKGROUND OF THE INVENTION

Resorcinol compounds have been widely used in various applications including rubber compounding and fabric dipping technologies. In rubber compound formulations, resorcinol resins have been widely used as methylene acceptors. Although the resorcinol resins generally provide sufficient adhesion properties, it is still desirable to improve the dynamic properties, such as storage modulus and tangent delta, of the rubber compounds by using novel resorcinol compounds.

The dipping technology has been extensively used throughout the rubber and tire industries to enhance the adhesion of rubber reinforcing materials such as fibers, filaments, fabrics or cords of polyesters (such as polyethylene terephthalate (PET) and polyethylene naphthalate (PEN)), polyamides (such as nylons and aramids), carbon or polybenzoxazole (PBO) to natural as well as synthetic rubbers. For improving the adhesion of rubbers to fibers of polyesters or polyamides, numerous modifications have been made in the dipping formulations. Among these modifications, the addition of blocked aromatic diisocyanates appeared to enhance the adhesion of PET to rubbers. In general, blocked diisocyanates, particularly the caprolactam- and phenol-blocked diisocyanates, have been widely used by the rubber and tire industries. Some common examples of caprolactam- and phenol-blocked diisocyanates are caprolactam- and phenol-blocked 4,4'-diphenylmethane diisocyanate (4,4'-MDI).

The use of phenol-blocked diisocyanates such as phenol-blocked 4,4'-MDI has been restricted in dipping formulations, possibly due to their high unblocking temperatures. Further, under the process temperature of the fabric-treating technology, which generally is between 150° C. and 240° C., the unblocking reaction produces phenol from the phenol-blocked aromatic diisocyanates and thus may pose toxic and hazardous problems. Further, the liberated phenol may remain unreacted and produce a possibly corrosive phenolic environment in the fabric treater and other equipment.

Caprolactam-blocked diisocyanates, such as caprolactam-blocked 4,4'-MDI (e.g., GRILBOND® IL-6 from EMS-Primid), have been extensively used as ingredients in dipping formulations for isocyanate treatment of rubber reinforcing materials without a resorcinol-formaldehyde-latex (RFL); or as dip additives in other dipping formulations such as the single- and double-step RFL dipping formulations for treating rubber reinforcing materials. Like phenol-blocked 4,4'-MDI, the caprolactam-blocked 4,4'-MDI generally has a high unblocking temperature. In some instances, the adhesion of PET cords to rubber compounds may be enhanced by blending the phenol- and caprolactam-blocked 4,4'-MDIs together and using in RFL formulations.

In addition to phenol- and caprolactam-blocked diisocyanates, diisocyanates such as 4,4'-MDI blocked with either resorcinol or a resorcinol resin can be used in fabric dipping formulations. The resorcinol-blocked and resorcinol resin-blocked diisocyanates may provide some unique characteristics as an ingredient or additive in the dipping formulations. For example, the resorcinol or resorcinol resin liberated from the unblocking reaction of a resorcinol- or resorcinol resin-blocked diisocyanate is more reactive than most other blocking agents, such as phenol or caprolactam. Therefore, resorcinol- or resorcinol resin-blocked diisocyanate provides additional reactive resorcinol or resorcinol resin which is the major reactive component in the RFL-type formulations. Further, resorcinol- or resorcinol resin-blocked diisocyanates have terminal phenolic hydroxyl groups which can promote the reaction between the resorcinol- or resorcinol resin-blocked diisocyanates and epoxy compounds present in dipping formulations.

Although the above-mentioned phenol-, caprolactam-, resorcinol- or resorcinol resin-blocked diisocyanates can provide satisfactory results in some applications, it is always desirable to provide the tire, rubber and other industries with new blocked isocyanates having improved properties, such as improved adhesion of various synthetic fiber materials to rubber compounds.

SUMMARY OF THE INVENTION

Disclosed herein are resorcinol resin-blocked isocyanate compositions that have unique properties, such as improved adhesion of rubber reinforcing materials to rubber materials or compounds. In one aspect, disclosed herein are resorcinol resin-blocked isocyanate compositions comprising:

(a) a first compound having Formula (VI'):

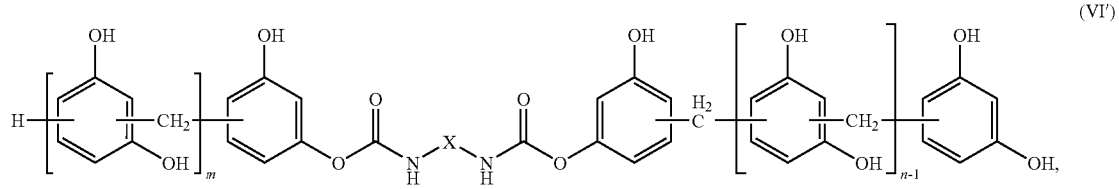

(b) a second compound having Formula (VII'):

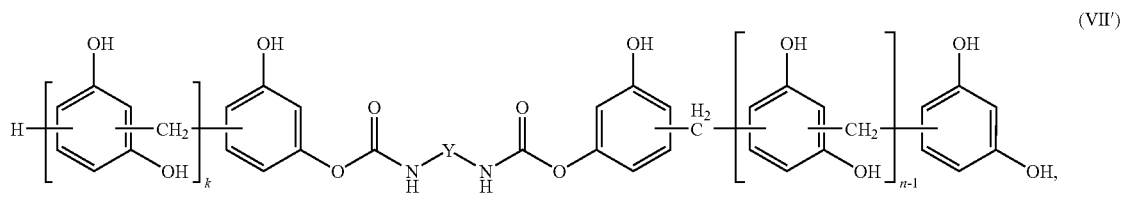

wherein X and Y are different and each of X and Y comprises independently alkylene, cycloalkylene, arylene, cycloalkarylene, alkarylene, aralkylene, heterocyclylene, heteroarylene or a combination thereof; and each of n, m and k is independently a distribution of integers having an average from about 1 to about 100.

In one embodiment, the resorcinol resin-blocked isocyanate composition further comprises a third compound having Formula (VIII'):

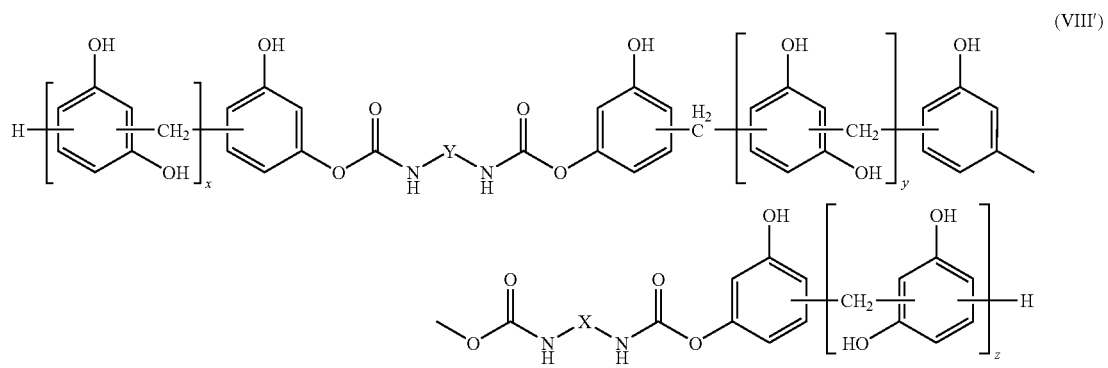

wherein X and Y are different and each of X and Y comprises independently alkylene, cycloalkylene, arylene, cycloalkarylene, alkarylene, aralkylene, heterocyclylene, heteroarylene or a combination thereof; and each of x, y and z is independently a distribution of integers having an average from about 1 to about 100.

In another aspect, disclosed herein are resorcinol resin-blocked isocyanate compositions obtainable from the reaction between at least two different isocyanate compounds and a resorcinol resin.

In another aspect, disclosed herein are processes for preparing a resorcinol resin-blocked isocyanate composition comprising reacting at least two different isocyanate compounds with a resorcinol resin.

In one embodiment, the resorcinol resin has Formula (V), Formula (V') or a combination thereof:

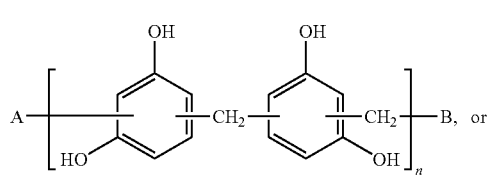

-continued

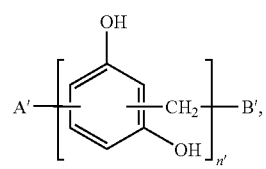

wherein each of n and n' is a distribution of integers having an average from about 1 to about 100; and each of A, B, A' and B' is independently an end group.

The resorcinol resin-blocked isocyanate composition of claim 5, wherein each of A, B, A' and B' is independently H, Formula (V-1) or Formula (V-2):

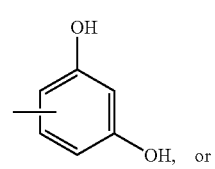

-continued

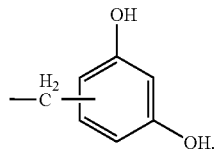
(V-2)

In another embodiment, the at least two isocyanate compounds have the formulae O=C=N—X—N=C=O and O=C=N—Y—N=C=O wherein X and Y are different and each of X and Y comprises independently alkylene, cycloalkylene, arylene, alkarylene, cycloalkarylene, aralkylene, heterocyclylene, heteroarylene or a combination thereof.

In another embodiment, each of X and Y is independently a divalent radical having one of the following formulae:

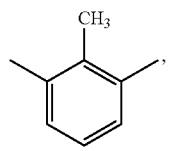
(A)

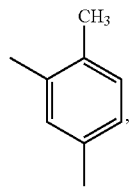
(B)

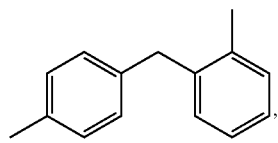
(C)

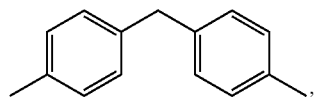
(D)

(E)

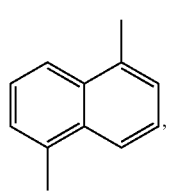
(F)

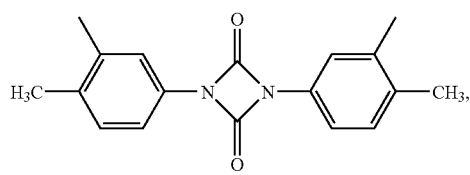
(G)

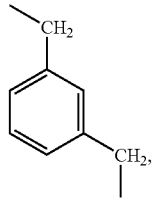
(H)

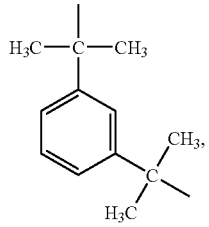
(I)

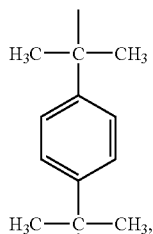
(J)

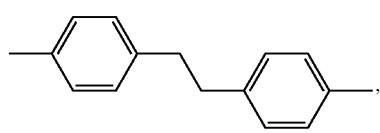
(K)

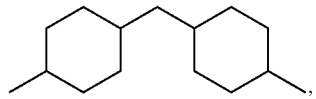
(L)

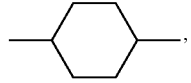
(M)

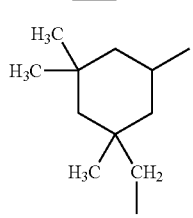
(N)
, and

(O)

In another embodiment, the process occurs in the absence of a solvent.

In another embodiment, the process occurs in the presence of a catalyst, which may be 3-methyl-1-phenyl-2-phospholene-1-oxide or dibutyltin dilaurate.

In another embodiment, the process occurs in the absence of a catalyst.

In another aspect, disclosed herein are vulcanizable rubber compositions comprising a rubber material, a methylene donor and a methylene acceptor comprising the resorcinol resin-blocked isocyanate composition disclosed herein.

In one embodiment, the rubber material is a natural or synthetic rubber.

In another embodiment, the vulcanizable rubber composition further comprises a rubber reinforcement material, which in some instances may be in the form of fibers, filaments, fabrics or cords; and/or may be made of a polyester, a polyamide, carbon, glass, steel, polybenzoxazole or rayon.

In another embodiment, the vulcanizable rubber composition further comprises a vulcanizing agent.

In another embodiment, the vulcanizable rubber composition further comprises at least an additive, wherein the additive may be carbon black, zinc oxide, silica, an antioxidant, a stearate, an accelerator, an adhesion promoter, a cobalt salt, stearic acid, a filler, a plasticizer, a wax, a processing oil, a retarder, an antiozonant or a combination thereof.

In another aspect, disclosed herein are dipping formulations comprising the resorcinol resin-blocked isocyanate composition of claim 1.

In one embodiment, the dipping formulation further comprises a solvent.

In another embodiment, the dipping formulation further comprises an additive, which in some instances may be an epoxy-containing compound, a thickener, an antifoam or a combination thereof.

In another embodiment, the dipping formulation further comprises a poly(vinyl pyridinelbutadiene/styrene) latex.

In another embodiment, the dipping formulation further comprises a resin solution, which in some instances may be a resorcinol-formaldehyde solution.

In another embodiment, the dipping formulation further comprises an additive, which in some instances may be an antifoam.

In another aspect, disclosed herein are fabricated articles comprising a rubber material and a rubber reinforcing material treated with the dipping formulation disclosed herein.

In one embodiment, the rubber material is a natural or synthetic rubber.

In another embodiment, the rubber reinforcing material is in the form of fibers, filaments, fabrics or cords, which in some instances may be made of a polyester, a polyamide, carbon, glass, steel, a polybenzoxazole or rayon.

In another embodiment, the fabricated article is a tire, power transmission belt, conveyor belt, V-belt, hose printing roll, rubber shoe heel, rubber shoe sole, automobile floor mat, truck mud flap or ball mill liner.

In another aspect, disclosed herein are coatings comprising a resin prepared by curing Formula (B), (B'), (C) or a combination thereof:

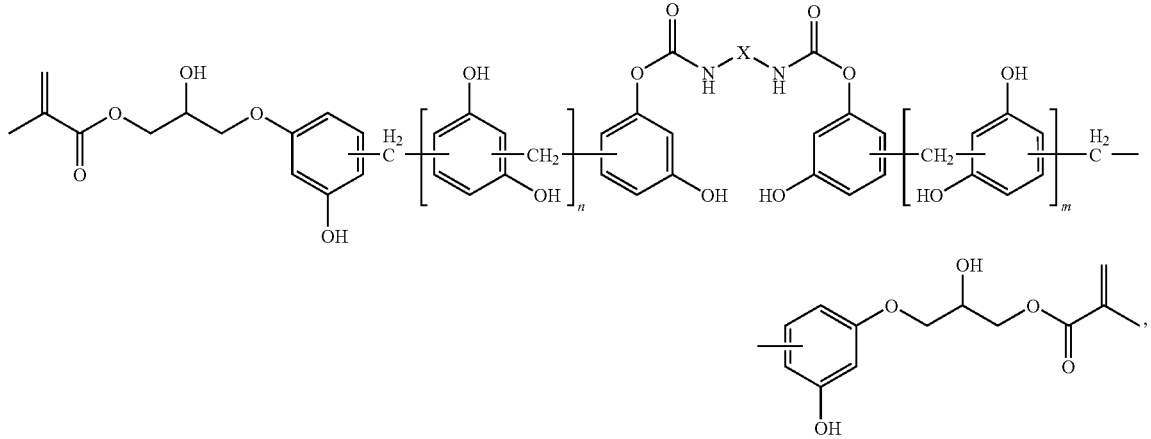

(B)

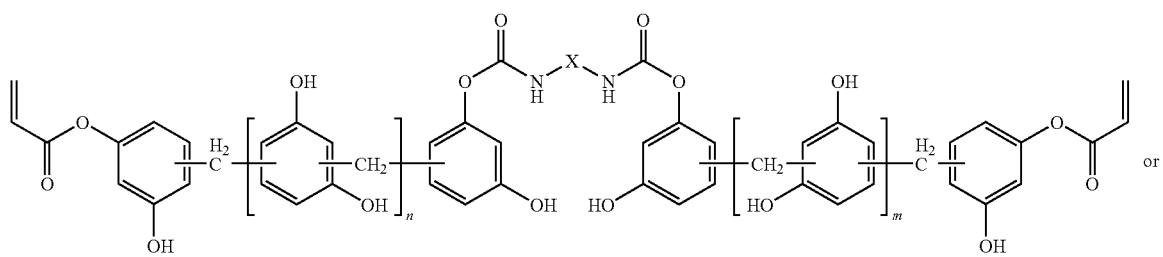

(B')

or

-continued

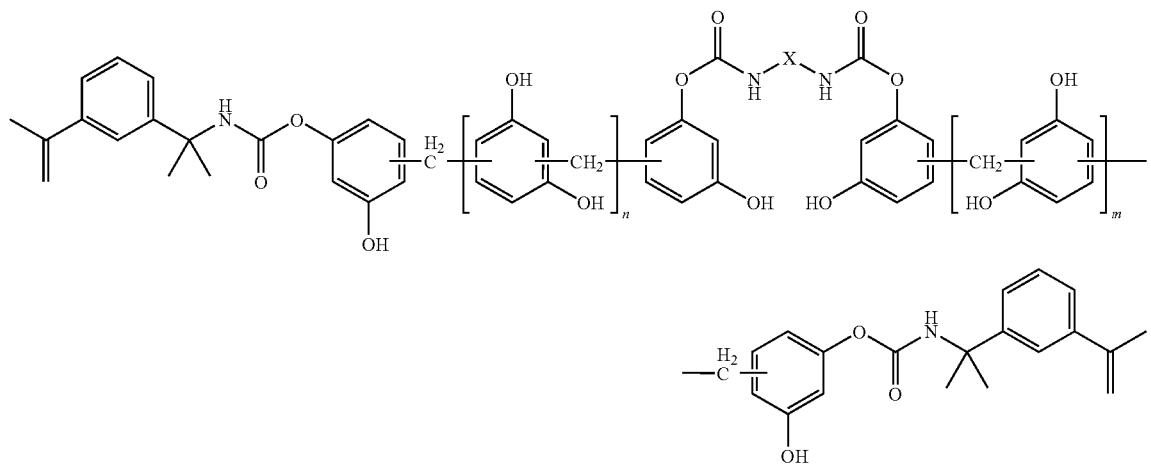

(C)

by heat, radiation or a combination thereof, wherein X is an alkylene, cycloalkylene, arylene, alkarylene, cycloalkarylene, aralkylene, heterocyclylene or a combination thereof; and each of n and m is a distribution of integers having an average from about 1 to about 100.

In one embodiment, the curing of (B), (B'), (C) or a combination thereof occurs in the presence of an initiator.

In another aspect, disclosed herein are coatings comprising a resin prepared by curing Formula (B), (D) or a combination thereof:

with a diisocyante, a polyisocyanate or a combination thereof, wherein X is an alkylene, cycloalkylene, arylene, alkarylene, cycloalkarylene, aralkylene, heterocyclylene or a combination thereof; and R is alkyl, aryl, aralkyl, siloxanyl, silyl ether or a combination thereof; and each of n and m is a distribution of integers having an average from about 1 to about 100.

In one embodiment, the coatings further comprise an additive, which in some instances may be a filler, rheology modifier, thickener, surfactant, wetting agent, cross-linking agent,

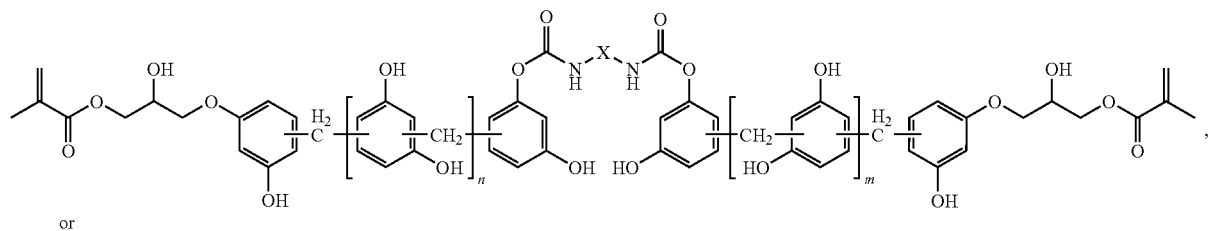

(B)

or

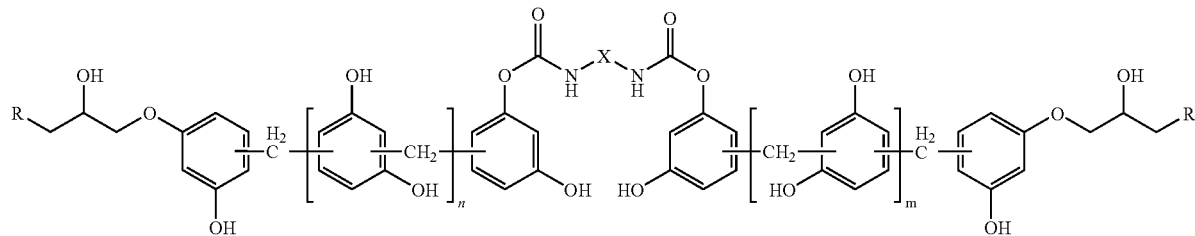

(D)

coupling agent, colorant, lubricant, leveling agent, antioxidant, UV stabilizer, plasticizer or a combination thereof.

DESCRIPTION OF EMBODIMENTS OF THE INVENTION

Figure 1:
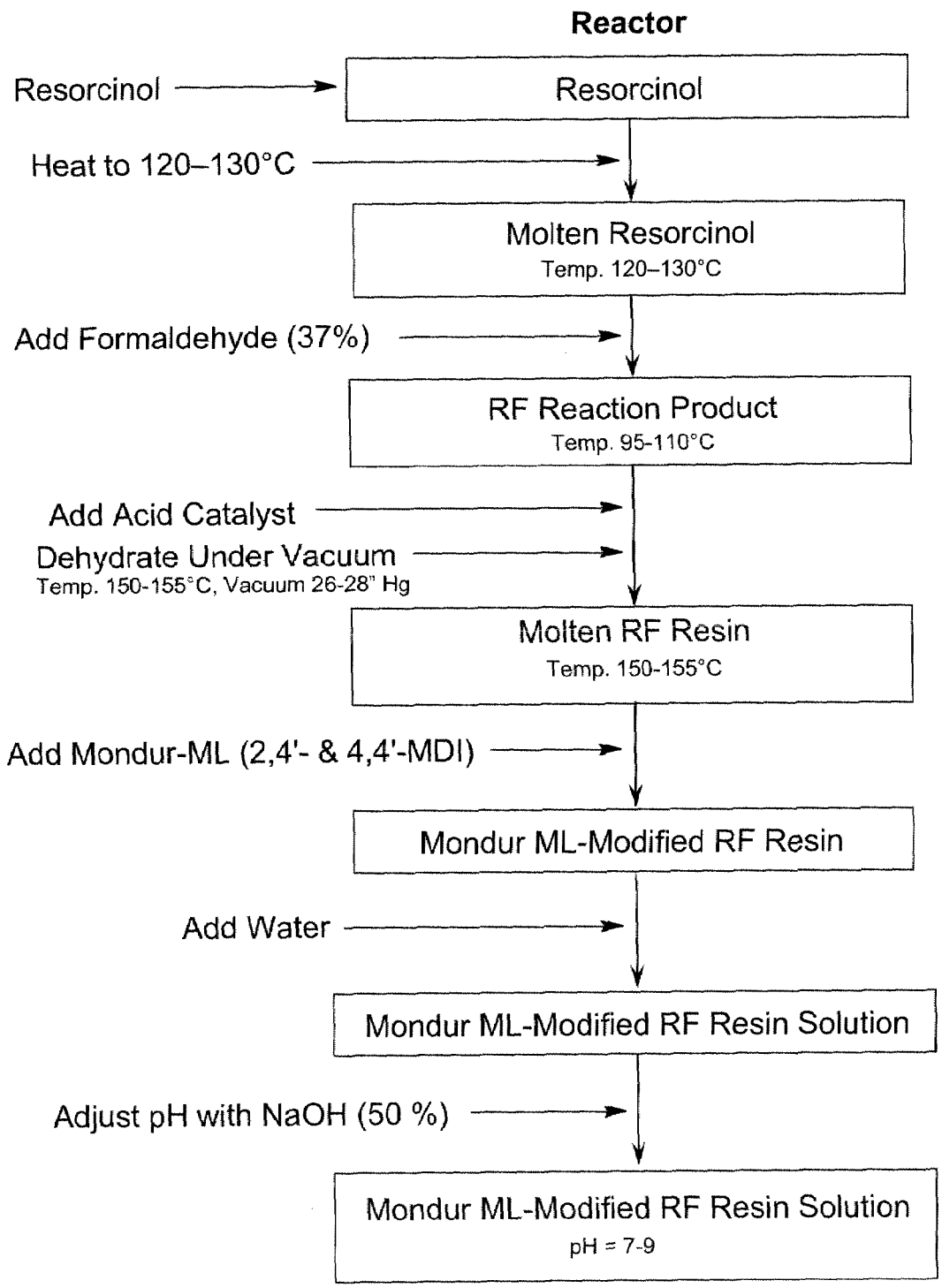
FIG. 1 depicts the process flow diagram showing the process steps of preparing a resorcinol resin-blocked isocyanate composition derived from resorcinol, formaldehyde and a mixture of 2,4'- and 4,4'-MDI.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

Generally, the resorcinol resin-blocked isocyanate compositions disclosed herein can improve the adhesion of various synthetic fiber materials to rubber compounds. In some embodiments, the resorcinol resin-blocked isocyanate compositions may be preparable or obtainable by reacting a resorcinol resin with at least two isocyanate compounds.

Any resorcinol resin that is reactive toward isocyanates may be used to prepare the resorcinol resin-blocked isocyanate compositions disclosed herein. The resorcinol resin can be prepared or obtained by reacting at least a resorcinol compound with at least an aldehyde. Some non-limiting examples of suitable resorcinol resins are described in U.S. Pat. Nos. 6,875,807, 5,945,500, 5,936,056, 5,075,414, 5,075,413, 5,049,641, 5,030,692, 5,021,522 and 4,889,891; in U.S. Patent Application Nos. 20040162391, 20040147712 and 20040116592; and in Raj B. Durairaj, "*Resorcinol: Chemistry, Technology and Applications*," Chapter 5, pp. 179-261 (2005), all of the above-mentioned patents, patent applications, and book reference are incorporated herein by reference. In some embodiments, the resorcinol resin is a resorcinol novolak resin.

Any resorcinol compound that can react with an aldehyde to form a resorcinol resin can be used. Some non-limiting examples of suitable resorcinol compounds are described in Raj B. Durairaj, "*Resorcinol: Chemistry, Technology and Applications*," Chapters 1-4, pp. 1-175 (2005), which is incorporated herein by reference. In some embodiments, the resorcinol compound may have Formula (I):

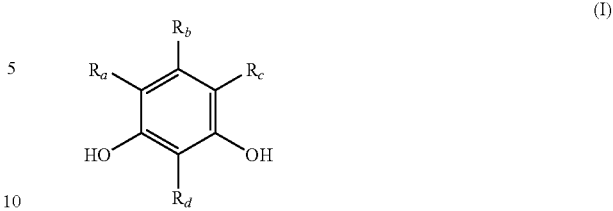

wherein each of $R_a$, $R_b$, $R_c$ and $R_d$ is independently hydrogen; hydroxy; halide such as fluoride, chloride, bromide and iodide; nitro; benzo; carboxy; acyl such as formyl, alkylcarbonyl (e.g. acetyl) and arylcarbonyl (e.g., benzoyl); alkyl such as methyl, ethyl, propyl, butyl, pentyl, hexyl, heptyl, octyl, nonyl, decyl, and the like; alkenyl such as unsubstituted or substituted vinyl and allyl; unsubstituted or substituted methacrylate; unsubstituted or substituted acrylate; silyl ether; siloxanyl; aryl such as phenyl and naphthyl; aralkyl such as benzyl; or alkaryl such as alkylphenyls, with the proviso that two of the $R_a$, $R_c$ and $R_d$ are each H. In some embodiments, each of $R_a$, $R_b$, $R_c$ and $R_d$ of the resorcinol compound of Formula (I) is H.

In some embodiments, the resorcinol compound of Formula (I) is not functionalized, i.e., each of $R_a$, $R_b$, $R_c$ and $R_d$ of the resorcinol compound of Formula (I) is H. Generally, when a non-functionalized resorcinol compound is used to prepare a resorcinol resin that reacts subsequently with the isocyanates, non-functionalized resorcinol resin-blocked isocyanates can be obtained. In other embodiments, the resorcinol compound of Formula (I) is functionalized where at least one of $R_a$, $R_b$, $R_c$ and $R_d$ is a functional group such as hydroxy; halide such as fluoride, chloride, bromide and iodide; nitro; benzo; carboxy; acyl such as formyl, alkylcarbonyl (e.g. acetyl) and arylcarbonyl (e.g., benzoyl); alkyl such as methyl, ethyl, propyl, butyl, pentyl, hexyl, heptyl, octyl, nonyl, decyl, and the like; alkenyl such as unsubstituted or substituted vinyl and allyl; unsubstituted or substituted methacrylate; unsubstituted or substituted acrylate; silyl ether; siloxanyl; aryl such as phenyl and naphthyl; aralkyl such as benzyl; or alkaryl such as alkylphenyls. Generally, when a functionalized resorcinol compound is used to prepare a resorcinol resin that reacts subsequently with the isocyanates, functionalized resorcinol resin-blocked isocyanates can be obtained.

The functionalized resorcinol resin-blocked isocyanates can be used as curing agents for both rubber and non-rubber applications such as polyurethane and polyurea applications. Further, as described later, the functionalized resorcinol resin-blocked isocyanates can also be used to prepare functionalized derivatives such as functionalized methacrylate, acrylate, alkenyl (e.g., vinyl and allylic), alkyl, aryl, aralkyl, siloxanyl, and silyl ether compounds for a variety of applications such as coating applications.

Some non-limiting examples of suitable resorcinol compounds include non-functionalized resorcinol compounds such as resorcinol; and functionalized resorcinol compounds such as orcinol, 2-methylresorcinol, phloroglucinol, 1,2,4-benzenetriol, pyrogallol, 3,5-dihydroxybenzaldehyde, 2,4-dihydroxybenzaldehyde, 4-ethylresorcinol, 2,5-dimethylresorcinol, 5-methylbenzene-1,2,3-triol, 3,5-dihydroxybenzyl alcohol, 2,4,6-trihydroxytoluene, 4-chlororesorcinol, 2',6'-dihydroxyacetophenone, 2',4'-dihydroxyacetophenone, 3',5'-dihydroxyacetophenone, 2,4,5-trihydroxybenzaldehyde, 2,3,4-trihydroxybenzaldehyde, 2,4,6-trihydroxybenzaldehyde, 3,5-dihydroxybenzoic acid, 2,4-dihydroxybenzoic acid, 2,6-dihydroxybenzoic acid, 1,3-dihydroxynaphthalene, 2',4'-dihydroxypropiophenone, 2',4'-dihydroxy-6'-methylacetophenone, 1-(2,6-dihydroxy-3-methylphenyl)ethanone, 3-methyl 3,5-dihydroxybenzoate, methyl 2,4-dihydroxybenzoate, galactophenone, 2,4-dihydroxy-3-methylbenzoic acid, 2,6-dihydroxy-4-methylbenzoic acid, methyl 2,6-dihydroxybenzoate, 2-methyl-4-nitroresorcinol, 2,4,5-trihydroxybenzoic acid, 3,4,5-trihydroxybenzoic acid, 2,3,4-trihydroxybenzoic acid, 2,4,6-trihydroxybenzoic acid, 2-nitrophloroglucinol or a combination thereof. In some embodiments, the resorcinol compound is resorcinol, orcinol, 2-methylresorcinol, phloroglucinol, 1,2,4-benzenetriol, pyrogallol, 3,5-dihydroxybenzaldehyde, 2,4-dihydroxybenzaldehyde, 4-ethylresorcinol, 4-chlororesorcinol or a combination thereof. In further embodiments, the resorcinol compound is resorcinol.

In reacting with the diisocyantes to form the resorcinol resin-blocked diisocyanates, the resorcinol resin can be optionally replaced partially or completely with at least another isocyanate blocking agent such as phenol compounds (e.g., phenol, p-chlorophenol, o-nitrophenol and m-cresol), alcohols, oximes, beta-dicarbonyl compounds (e.g., diethyl malonate, ethyl acetoacetate, acetyl acetone, and malononitrile), lactams (e.g., caprolactam), mercaptans, amines, carbamates, amides, imines, carboxylic acids, imidazoles (e.g., benzimidazole, 2-phenylimidazole), and the like. In some embodiments, the resorcinol resin is replaced partially or completely with caprolactam, a phenol compound, or a combination thereof. In other embodiments, the resorcinol resin is replaced partially or completely with a phenol compound having Formula (IA):

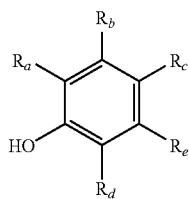

(IA)

wherein each of $R_a$, $R_b$, $R_c$, $R_d$ and $R_e$ of the phenol compound of Formula (IA) is independently hydrogen; hydroxy; halide such as fluoride, chloride, bromide and iodide; nitro; benzo; carboxy; acyl such as formyl, alkylcarbonyl (e.g. acetyl) and arylcarbonyl (e.g., benzoyl); alkyl such as methyl, ethyl, propyl, butyl, pentyl, hexyl, heptyl, octyl, nonyl, decyl, and the like; aryl such as phenyl and naphthyl; aralkyl such as benzyl; or alkaryl such as alkylphenyls. In other embodiments, each of $R_a$, $R_b$, $R_c$, $R_d$ and $R_e$ of the phenol compound of Formula (IA) is independently H, halide, or alkyl. In a particular embodiment, each of $R_a$, $R_b$, $R_c$, $R_d$ and $R_e$ of the phenol compound of Formula (I) is H. Some blocking agents are disclosed in Zeno W. Wickes, Jr., "Blocked Isocyanates," *Progress in Organic Coatings*, Volume 3, Pages 73-79 (1973), which is incorporated herein by reference. Some blocking agents are also disclosed in U.S. Pat. Nos. 6,509,433; 6,368,669; 6,242,530; 6,063,860; 5,986,033; 5,352,755; 5,246,557; 4,976,837; and 3,987,033, all of which are incorporated herein by reference.

The ratio of the resorcinol resin to the at least another isocyanate blocking agent can be from about 1:99 to about 99:1 by weight or any other ratios that is recognized by a skilled artisan. In some embodiments, the mole ratio of the resorcinol resin to the at least another isocyanate blocking agent is from about 5:95 to about 95:5, from about 10:90 to about 90:10, from about 15:85 to about 85:15, from about 20:80 to about 80:20, from about 25:75 to about 75:25, from about 70:30 to about 30:70, from about 40:60 to about 60:40 or at about 50:50 by weight. In other embodiments, the resorcinol resin is completely replaced with the at least another isocyanate blocking agent. In further embodiment, the resorcinol resin is not replaced with another isocyanate blocking agent.

Any aldehyde that can react with the resorcinol compound disclosed herein to form a resorcinol resin can be used. In some embodiments, the aldehyde compound may have the formula R—CHO where R can be H, alkyl, alkenyl, cycloalkyl, aryl, heteroaryl, heterocyclyl or a combination thereof, such as alkaryl and aralkyl. Some non-limiting examples of suitable aldehydes include formaldehyde, acetaldehyde, propionaldehyde, butyraldehyde, isobutyraldehyde, valeraldehyde, crotonaldehyde, benzaldehyde, furfural and combinations thereof.

In some instances, one or more modifiers can be added to the reaction mixture containing the resorcinol compound and the aldehyde to adjust the mechanical, chemical and/or physical properties of the cured or uncured resorcinol resins. Some non-limiting examples of suitable modifiers include vinyl compounds such as styrene, unsaturated hydroxy compounds, unsaturated aliphatic aldehyde compounds, aliphatic dialdehyde compounds, silanes and combinations thereof.

Some non-limiting examples of the unsaturated hydroxy compounds suitable for modifying the resorcinol resins are represented by Formula (II):

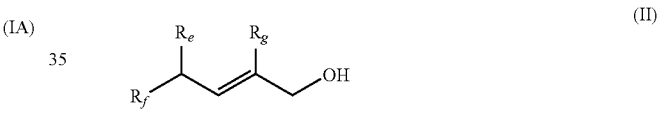

(II)

where each of $R_e$, $R_f$ and $R_g$ is independently hydrogen, hydroxyl, or a hydrocarbyl group with the proviso that one of $R_e$, $R_f$ and $R_g$ is hydrogen. In some embodiments, the hydrocarbyl group is an aliphatic straight or branched alkyl. In other embodiments, each of $R_e$, $R_f$ and $R_g$ is independently —H, —CH$_3$, —C$_2$H$_5$, —C$_3$H$_7$, —C$_4$H$_9$, —C$_5$H$_{11}$, —C$_6$H$_{13}$, —OH, —CH$_2$OH, —CH$_3$CH$_2$OH. In further embodiments, each $R_e$ and $R_g$ is hydrogen, and $R_f$ is an alkyl of C$_1$ to C$_5$ in which one hydrogen is substituted by an —OH group. In some embodiments, the aliphatic unsaturated hydroxy compound is 1,4-dihydroxy-2-butene, 1,4-dihydroxy-2-pentene, 1,4-dihydroxy-2-hexene, 1,4-dihydroxy-2-heptene, 1,4-dihydroxy-2-octene, 1,5-dihydroxy-2-pentene, 1,6-dihydroxy-2-hexene, 1,7-dihydroxy-2-heptene, 1,8-dihydroxy-2-octene or a combination thereof.

Some non-limiting examples of the unsaturated aliphatic aldehyde compounds suitable for modifying the resorcinol resins are represented by Formula (III):

(III)

wherein each of $R_i$, $R_h$ and $R_j$ is independently hydrogen or a hydrocarbyl group. In some embodiments, the hydrocarbyl group is an aliphatic straight or branched alkyl. In other embodiments, each $R_i$, $R_h$ and $R_j$ is independently —H, —CH$_3$, —C$_2$H$_5$, —C$_3$H$_7$, —C$_4$H$_9$, —C$_5$H$_{11}$, —C$_6$H$_{13}$. In further embodiments, $R_j$ is hydrogen or a straight or branched $C_1$-$C_5$ alkyl. In some embodiments, the unsaturated aliphatic aldehyde compound is crotonaldehyde, acrolein, methacrolein, or a combination thereof.

Some non-limiting examples of the aliphatic dialdehyde compounds suitable for modifying the resorcinol resins are represented by Formula (IV):

O=HC—(CH$_2$)$_n$—CH=O  (IV)

wherein n is equal to or greater than 1. In some embodiments, n is 1, 2, 3, 4, 5, 6, 7, 8, 9, and 10. In other embodiments, n is 1, 2, 3, 4, and 5. In further embodiments, the aliphatic dialdehyde compounds is malonaldehyde, succinaldehyde, glutaraldehyde, adipaldehyde, or a combination thereof.

Some non-limiting examples of the silanes suitable for modifying the resorcinol resins include, but are not limited to, 3-(aminopropyl)triethoxysilane, 3-(isocyanatopropyl)triethoxysilane, 3-(glycidyloxypropyl)trimethoxysilane, 3-(mercaptopropyl)trimethoxysilane, N-beta-aminoethyl-3-(aminopropyl)trimethoxysilane, 3-(aminopropyl)trimethoxysilane, 3-(aminoethyl)triethoxysilane, 3-(glycidyloxyethyl) triethoxysilane, 3-(mercaptopropyl)triethoxysilane, N-beta-aminoethyl-3-(aminoethyl)-trimethoxysilane, 3-(aminobutyl)triethoxysilane, 3-(aminoethyl)trimethoxysilane, 3-(aminopropyl)methyldiethoxysilane, N-(3-(triethoxysilyl)propyl)urea, 3,3'-bis(trimethoxysilylpropyl)disulfide, 3,3'-bis(triethoxysilylpropyl)tetrasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(trimethoxysilylpropyl) hexasulfide, 3,3'-bis(trimethoxysilylpropyl)octasulfide, 3,3'-bis(trioctoxysilylpropyl)tetrasulfide, 3,3'-bis (trihexoxysilylpropyl)disulfide, bis-silyl-aminosilanes, vinylmethyldiethoxysilane, vinylmethyldimethoxysilane, vinyltriethoxysilane, vinyltributoxysilane, vinyltriisopropoxysilane, vinyltriisopropenoxysilane, vinyltrimethoxysilane, vinyltriphenoxysilane, vinyltris(2-methoxyethoxy)silane, vinyldimethylethoxysilane and combinations thereof.

In some embodiments, the resorcinol resin is prepared from a reaction mixture comprising a resorcinol compound and an aldehyde. In other embodiments, the resorcinol resin is prepared from a reaction mixture comprising resorcinol and formaldehyde. In further embodiments, the resorcinol-formaldehyde reaction occurs in the presence of at least a modifier. In further embodiments, the resorcinol-formaldehyde reaction occurs in the presence of an acid catalyst. In particular embodiments, the resorcinol-formaldehyde reaction occurs with the mole ratio of resorcinol to formaldehyde being greater than about 1 to 1, greater than about 1.05 to 1, greater than about 1.1 to 1, greater than about 1.2 to 1, greater than about 1.3 to 1, greater than about 1.4 to 1, or greater than about 1.5 to 1. In further embodiments, the resorcinol resin may have Formula (V), (V') or a combination thereof:

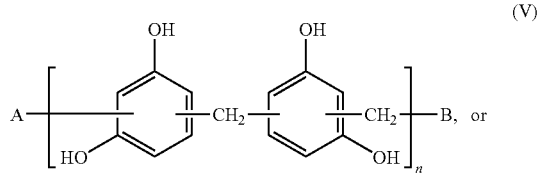

(V)

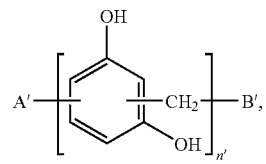

(V')

wherein each of n and n' is a distribution of integers having an average from about 1 to about 100; and each of A, B, A' and B' is independently an end group.

In general, the distributions and averages of n or n' values depend on various factors such as the mole ratio of the starting materials; the reaction time and temperature; the presence or absence of a chain terminating agent, an acid catalyst or a base catalyst; the polymerization conditions and the like. The extent of polymerization, as specified with n or n' can affect the properties of the resulting resorcinol resin. In some embodiments, the average of n or n' varies from about 1 to about 100. In other embodiments of interest, the average of n or n' varies from about 1 to about 50. In further embodiments, the average of n varies from about 1 to about 10. In further embodiments, the average of n' varies from about 1 to about 20. A person of ordinary skill in the art will recognize that additional ranges of the average of n or n' are contemplated and are within the present disclosure. Further, the presence of the resorcinol resin (V) or (V') does not preclude the presence of any unreacted monomer(s) (i.e., the resorcinol compound(s), aldehyde(s) and/or modifier(s)) within the resorcinol resin, although the concentrations of the unreacted aldehyde(s) or other modifier(s) would generally be small if not extremely small or undetectable The end groups A, B, A' and B' may vary between different polymer units depending on many factors such as the mole ratio of the starting materials; the presence or absence of a chain terminating agent, an acid catalyst or a base catalyst; the state of the resorcinol-aldehyde polymerization process at the end of the polymerization step and the like. In some embodiments, each of A, B, A' and B' is independently H, or has Formula (V-1) or (V-2):

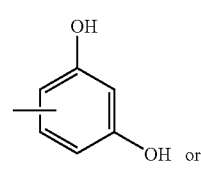

(V-1)

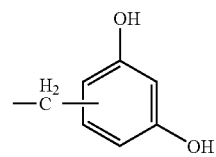

(V-2)

In some embodiments, the resorcinol resin has Formula (V) wherein A is H; B has Formula (V-1); and n is a distribution of integers having an average from about 1 to about 10. In other embodiments, the resorcinol resin has Formula (V') wherein A' is H; B' has Formula (V-1); and n' is a distribution of integers having an average from about 1 to about 20.

In some embodiments, the phenyl rings of Formula (V) or (V') optionally comprise at least one substituent including, but not limited to, alkyl, aryl, alkaryl, cycloalkaryl, aralkyl, alkenyl, alkynyl, acyl, carboxy, heterocyclyl, halide, nitro, hydroxy and the like. In other embodiments, the methylene groups of Formula (V) or (V') optionally comprise one or two substituents including, but not limited to, alkyl, aryl, alkaryl, cycloalkaryl, aralkyl, alkenyl, alkynyl, heterocyclyl and the like.

Any isocyanate compound that can react with a hydroxyl compound may be used for the preparation of the resorcinol resin-blocked isocyanate compositions. Some non-limiting examples of suitable isocyanate compounds include monoisocyanates such as alkyl isocyanates (e.g., methyl isocyanate and ethyl isocyanate), cycloalkyl isocyanate (e.g., cyclopropyl isocyanate, cyclobutyl isocyanate, cyclopentyl isocyanate, cyclohexyl isocyanate and trans-4-methylcyclohexyl isocyanate), aryl isocyanates (e.g., phenyl isocyanate, 4-chlorophenyl isocyanate, 2,4-difluorophenyl isocyanate, 2,6-dimethylphenyl isocyanate, 2,6-diisopropylphenyl isocyanate, tolyl isocyanate, and naphthyl isocyanate), aralkyl isocyanates (e.g., methylbenzyl isocyanate), unsaturated isocyanates, halogenated alkyl and aryl isocyanates, carbonyl, thiocarbonyl and imidoyl isocyanates, sulfur isocyanates, phosphorous isocyanates, and inorganic isocyanates; diisocyanates such as aliphatic diisocyanates and aromatic diisocyanates; triisocyanates such as 4,4',4"-triphenylmethane triisocyanates (e.g., DESMODUR® R from Bayer MaterialScience, Pittsburgh, Pa.), tris-(4-isocyanatophenyl) thiophosphate (e.g., DESMODUR® RF from Bayer MaterialScience) and biuret of hexamethylene diisocyanate (e.g., DESMODUR® N from Bayer MaterialScience); and other polyisocyanates such as MONDUR® MRS, MONDUR® MR Light, MONDUR® MRS 2, MONDUR® MRS 4, MONDUR® MRS 5, BAYHYDUR®, BAYMIDUR® and DESMODUR® polyisocyanates from Bayer MaterialScience and TOLONATE® X C3 polyisocyanate from Rhodia, Cranbury, N.J. In some embodiments, the polyisocyanates are MDI-based polyisocyanates (PMDIs) including MONDUR® MRS, MONDUR® MR Light, MONDUR® MRS 2, MONDUR® MRS 4 and MONDUR® MRS 5. Some isocyanates suitable for this invention are disclosed in Henri Ulrich, "Chemistry and Technology of Isocyanates," John Wiley & Sons (1997), which is incorporated herein by reference in its entirety.

Some non-limiting examples of suitable aromatic diisocyanates include 2,4-toluene diisocyanate (2,4-TDI; e.g., MONDUR® TDS from Bayer MaterialScience), 2,6-toluene diisocyanate (2,6-TDI), 2,2'-diphenylmethane diisocyanate (2,2'-MDI), 4,4'-diphenylmethane diisocyanate (4,4'-MDI, e.g., MONDUR® M and MONDUR® CD from Bayer MaterialScience and ISONATE® 125 from Dow), 2,4'-diphenylmethane diisocyanate (2,4'-MDI), 1,5-naphthylene diisocyanate (NDI; e.g., DESMODUR® 15 from Bayer and TAKENATE® 700 from Mitsui Takeda Chemicals, Inc., Tokyo, Japan), 1,4-phenylene diisocyanate (PDI), dimerized toluene diisocyanate (e.g., DESMODUR® TT from Bayer MaterialScience), ethylene diphenylene diisocyanate (EDI), and combinations thereof (e.g., an isocyanate mixture comprising 2,4'-MDI and 4,4'-MDI such as MONDUR® ML from Bayer MaterialScience.

Some non-limiting examples of suitable aliphatic diisocyanates or triisocyanates include 4,4'-cyclohexylmethane diisocyanate ($H_{12}$MDI; e.g., DESMODUR® W from Bayer), hexamethlyene-1,6-diisocyanate (1,6-HDI; e.g., MONDUR® HX from Bayer MaterialScience and COSMONATE® ND from Mitsui Takeda Chemicals, Inc.), isophorone diisocyanate (IPDI; available from Huels America Inc., Somerset, N.J.), 2,2,4-trimethylhexamethylene diisocyanate (2,2,4-TMDI; available from Huels America Inc.), 2,4,4-trimethylhexamethylene diisocyanate (2,4,4-TMDI; available from Huels America Inc.), trimer of hexamethylene-1,6-diisocyanate (e.g., DESMODUR® N 3300 from Bayer MaterialScience), trimer of isophorone diisocyanate (e.g., ISOCYANATE® T 1890 from Huels America Inc.), 1,4-cyclohexane diisocyanate (CHDI; available from Akzo, Chicago, Ill.), m-tetramethylxylene diisocyanate (m-TMXDI; available from American Cyanamid, Wayne, N.J.), p-tetramethylxylene diisocyanate (p-TMXDI; available from American Cyanamid), xylene diisocyanate (XDI; e.g., TAKENATE® 500; available from Mitsui Takeda Chemicals, Inc), norbornanediisocyanate (NBDI; e.g., COSMONATE® NBDI from is Mitsui Takeda Chemicals, Inc.), and 1,3-bis(isocyanatomethyl)cyclohexane ($H_6$XDI; e.g., TAKENATE® 600; available from Mitsui Takeda Chemicals, Inc).

In some embodiments, each of the at least two isocyanate compounds is independently a monoisocyanate, a diisocyanate, a triisocyanate or a higher polyisocyanate. In other embodiments, one of the at least two isocyanate compounds is a monoisocyanate and another is a diisocyanate. In further embodiments, one of the at least two isocyanate compounds is a monoisocyanate and another is a triisocyanate. In further embodiments, one of the at least two isocyanate compounds is a diisocyanate and another is a triisocyanate.

In certain embodiments, each of the at least two isocyanate compounds is a diisocyanate. In further embodiments, each of the two diisocyanate compounds is an aromatic diisocyanate such as MDI, TDI, PDI and EDI. In further embodiments, each of the two diisocyanate compounds is an aliphatic diisocyanate such as $H_{12}$MDI, 1,6-HDI, IPDI, 2,2,4-TMDI, 2,4,4-TMDI, CHDI, m-TMXDI, p-TMXDI, XDI and $H_6$XDI. In further embodiments, one of the two diisocyanate compounds is an aromatic diisocyanate and another is an aliphatic diisocyanate. In further embodiments, one of the two diisocyanate compounds is or comprises an MDI (e.g., 2,4'-MDI and 4,4'-MDI) and another is or comprises a TDI (e.g., 2,4-TDI and 2,6-TDI). In particular embodiments, the two diisocyanate compounds are or comprise 2,4'-MDI and 4,4'-MDI, such as MONDUR® ML from Bayer MaterialScience.

When two isocyanate compounds are used, the mole ratio of the two isocyanate compounds can be between about 99:1 and about 1:99, between about 95:5 and about 5:95, or between about 90:10 and about 10:90. In some embodiments, the mole ratio of the two isocyanate compounds is between about 85:15 and about 15:85 or between about 80:20 and about 20:80, or between about 75:25 and about 25:75. In further embodiments, the mole ratio of the two isocyanate compounds is between about 70:30 and about 30:70. In further embodiments, the mole ratio of the two isocyanate compounds is between about 65:35 and about 35:65. In further embodiments, the mole ratio of the two isocyanate compounds is between about 60:40 and about 40:60, between about 55:45 and about 45:55 or at about 50:50.

When two or more isocyanate compounds are used, the mole fraction of each isocyanate compound with respect to all isocyanate compounds can be greater than or equal to about 0.01, about 0.02, about 0.04, about 0.05, about 0.075, about 0.10, about 0.15, about 0.20 or about 0.25. In some embodiments, the mole fraction of each isocyanate compounds with respect to all isocyanate compounds is greater than or equal to about 0.05, about 0.15 or about 0.25. When two or more isocyanate compounds are used, the mole fraction of each isocyanate compound with respect to all isocyanate compounds can be less than or equal to about 0.99, about 0.975, about 0.95, about 0.90, about 0.85, about 0.80, about 0.75, about 0.70, about 0.65, about 0.60, about 0.55, or about 0.50. In some embodiments, the mole fraction of each isocyanate compound with respect to all isocyanate compounds is less than or equal to about 0.85, about 0.75, about 0.65. In further embodiments, the mole fraction of each isocyanate compound with respect to all isocyanate compounds is between about 0.01 and about 0.99, between about 0.02 and about 0.98, between about 0.05 and about 0.95, between about 0.10 and about 0.90, between about 0.15 and about 0.85, between about 0.20 and about 0.80 or between about 0.25 and about 0.75.

The reaction between the resorcinol resin with the at least two isocyanate compounds can occur in the presence or absence of a solvent. In some embodiments, the reaction occurs in a solvent such as tetrahydrofuran, diethyl ether, methyl ethyl ketone, acetone acetonitrile, N,N-dimethyl formamide or a combination thereof. In other embodiments, the reaction occurs in the absence of a solvent.

Any reaction temperature that is suitable for the reaction between the resorcinol resin with the at least two isocyanate compounds can be used. In some embodiments, the reaction temperature can be higher than about 25° C., about 35° C., about 45° C., about 55° C., about 65° C., about 75° C., about 80° C., about 85° C., about 90° C., about 95° C., about 100° C., about 105° C., about 110° C., about 115° C., or about 120° C. In the presence of a solvent, the reaction temperature can be the boiling point of the solvent.

Any catalyst that is suitable for the reaction between the resorcinol resin with the isocyanate compounds can be used. In some embodiments, the catalyst is 3-methyl-1-phenyl-2-phospholene-1-oxide, dibutyltin dilaurate, a urethane catalyst, a tertiary amine catalyst, a tin salt or a combination thereof. In other embodiments, the catalyst is 3-methyl-1-phenyl-2-phospholene-1-oxide or dibutyltin dilaurate. In other embodiments, the reaction occurs in the absence of a catalyst.

In some embodiments, the resorcinol resin-blocked isocyanate composition is obtainable or preparable by reacting the resorcinol resin with two diisocyanates having the formulae O=C=N—X—N=C=O and O=C=N—Y—N=C=O wherein X and Y are different and each of X and Y is or comprises independently alkylene, cycloalkylene, arylene, cycloalkarylene, alkarylene, aralkylene, heterocyclylene, heteroarylene or a combination thereof. The Is alkylene, cycloalkylene, arylene, alkarylene, cycloalkarylene, aralkylene, heterocyclylene, heteroarylene radicals can be optionally substituted with alkyl, aryl, alkaryl, cycloalkaryl, aralkyl, alkenyl, alkynyl, acyl, carboxy, heterocyclyl, halide, nitro, hydroxy, —N=C=O, —N=C=S or a combination thereof. In other embodiments, each of X and Y is independently a divalent radical having one of the following the formulae:

(A)
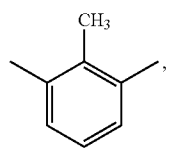

(B)
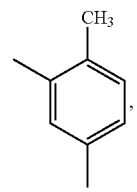

(C)
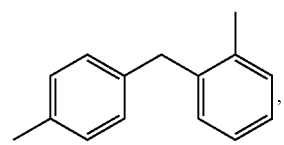

(D)
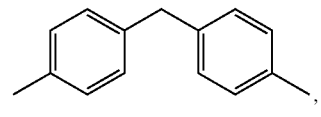

(E)
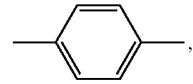

(F)
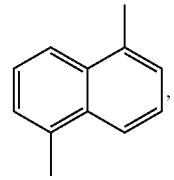

(G)
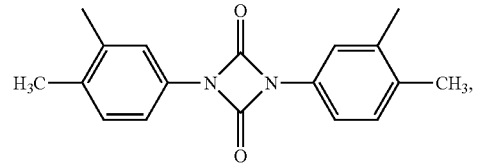

(H)
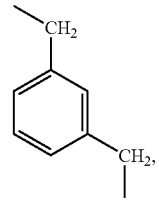

(I)
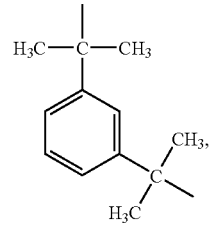

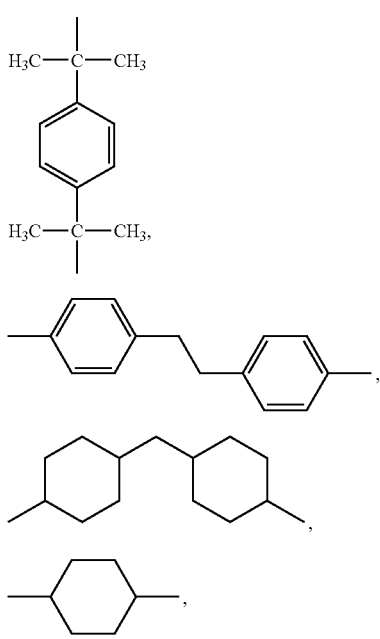

(J)

(K)

(L)

(M)

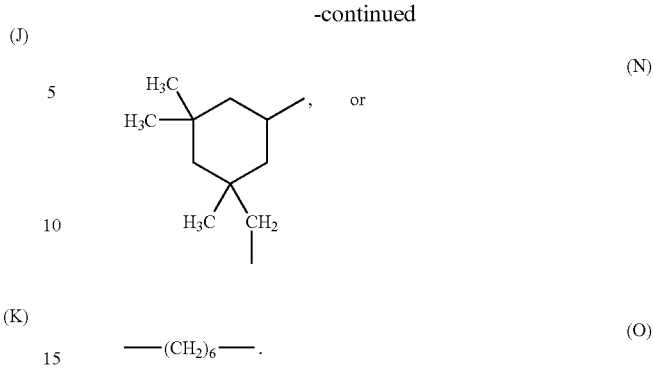

(N)

—(CH$_2$)$_6$—.

(O)

In some instances, the resorcinol resin-blocked isocyanate composition is prepared or obtained from the reaction between the resorcinol resin of Formula (V) and an isocyanate mixture comprising O=C=N—X—N=C=O and O=C=N—Y—N=C=O. Any of the hydroxyl groups of the resorcinol resin of Formula (V), including those in the end groups (i.e., terminal hydroxyl groups), may react with the isocyanates. In some embodiments, the resorcinol resin-blocked isocyanate composition comprises Formula (VI), (VII), (VIII), or a combination thereof:

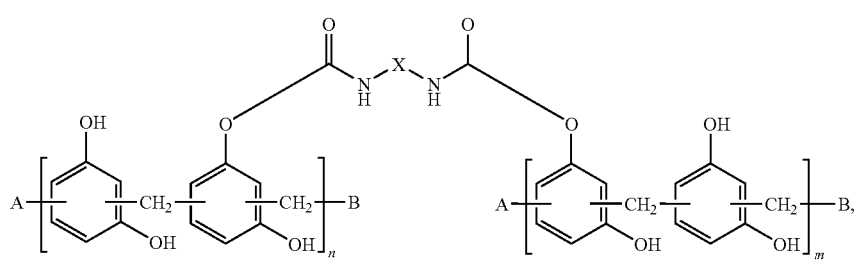

(VI)

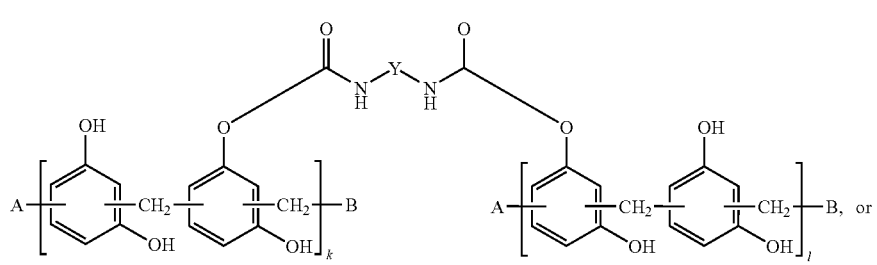

(VII)

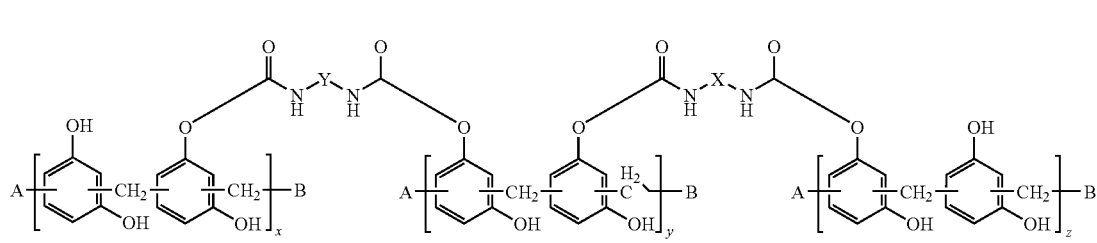

(VIII)

wherein A, B, X and Y are as defined above; and each of x, y, z, n, m, l and k is independently a distribution of integers having an average from about 1 to about 100, from about 1 to about 50, from about 1 to about 20, or from about 1 to about 10. In some embodiments, each of Formulae (VI), (VII) and (VIII) is optionally and independently substituted with alkyl, aryl, alkaryl, cycloalkaryl, aralkyl, alkenyl such as unsubstituted or substituted vinyl and allyl, siloxanyl, alkynyl, acyl, carboxy, heterocyclyl, halide, nitro, hydroxy, unsubstituted or substituted methacrylate, unsubstituted or substituted acrylate, silyl ether, or a combination thereof. In other embodiments, Formulae (VI), (VII) and/or (VIII) have one or more embodiments, the resorcinol resin-blocked isocyanate composition comprises Formulae (VI), (VII) and (VIII).

In other instances, the resorcinol resin-blocked isocyanate composition may be prepared or obtained from the reaction between the resorcinol resin of Formula (V') wherein A is H and B has Formula (V-1) and an isocyanate mixture comprising O=C=N—X—N=C=O and O=C=N—Y—N=C=O wherein each of X and Y is as defined above. In other embodiments, the terminal hydroxyl groups of the resorcinol resin of Formula (V) react with the isocyanates. In further embodiments, the resorcinol resin-blocked isocyanate composition comprises Formula (VI'), (VII'), (VIII') or a combination thereof:

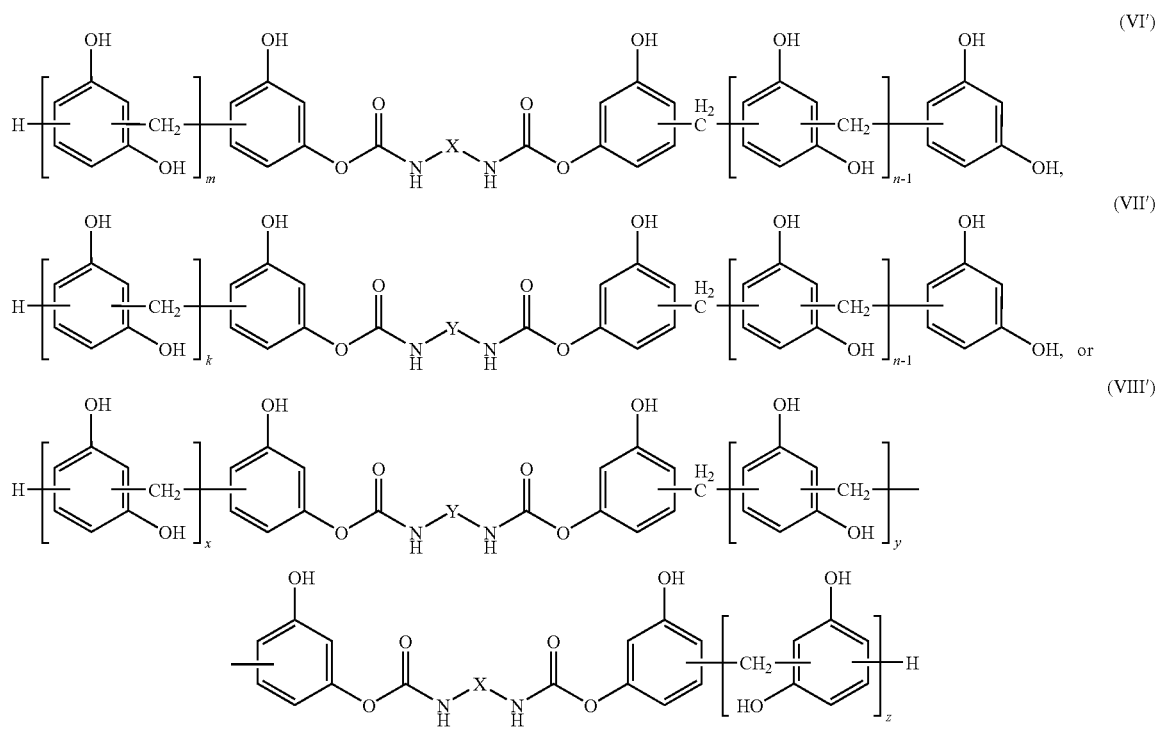

wherein X and Y are as defined above; and each of x, y, z, n, m and k is independently a distribution of integers having an average from about 1 to about 100, from about 1 to about 50, from about 1 to about 20, or from about 1 to about 10. In some embodiments, each of Formulae (VI'), (VII') and (VIII') is optionally and independently substituted with alkyl, aryl, alkaryl, cycloalkaryl, aralkyl, alkenyl such as unsubstituted or substituted vinyl and allyl, siloxanyl, alkynyl, acyl, carboxy, heterocyclyl, halide, nitro, hydroxy, unsubstituted or substituted methacrylate, unsubstituted or substituted acrylate, silyl ether, or a combination thereof. In other embodiments, Formulae (VI'), (VII') and/or (VIII') have one or more substituents. In further embodiments, Formulae (VI'), (VII') and/or (VIII') have no substituent.

In some embodiments, the resorcinol resin-blocked isocyanate composition comprises Formulae (VI') and (VII'). The ratio of Formula (VI') to Formula (VII') can be from about 1:99 to about 99:1 by weight. In some embodiments, the ratio of Formula (VI') to Formula (VII') is between about 5:95 and about 95:5, between about 10:90 and about 90:10, between about 15:85 and about 85:15, between about 20:80 and about 80:20, between about 25:75 and about 75:25, between about substituents. In further embodiments, Formulae (VI), (VII) and/or (VIII) have no substituent.

In some embodiments, the resorcinol resin-blocked isocyanate composition comprises Formulae (VI) and (VII). The ratio of Formula (VI) to Formula (VII) can be from about 1:99 to about 99:1 by weight. In some embodiments, the ratio of Formula (VI) to Formula (VII) is between about 5:95 and about 95:5, between about 10:90 and about 90:10, between about 15:85 and about 85:15, between about 20:80 and about 80:20, between about 25:75 and about 75:25, between about 30:70 and about 70:30, between about 35:65 and about 65:35 or between about 40:60 and about 60:40 by weight. In other embodiments, the ratio of Formula (VI) to Formula (VII) is between about 10:90 and about 90:10 by weight. In other embodiments, the ratio of Formula (VI) to Formula (VII) is between about 10:90 and about 90:10 by weight. In further embodiments, the ratio of Formula (VI) to Formula (VII) is between about 20:80 and about 80:20 by weight. In further embodiments, the ratio of Formula (VI) to Formula (VII) is between about 35:65 and about 65:35 by weight.

In other embodiments, the resorcinol resin-blocked isocyanate composition comprises Formula (VIII). In further 30:70 and about 70:30, between about 35:65 and about 65:35 or between about 40:60 and about 60:40 by weight. In other embodiments, the ratio of Formula (VI') to Formula (VII') is between about 10:90 and about 90:10 by weight. In other embodiments, the ratio of Formula (VI') to Formula (VII') is between about 10:90 and about 90:10 by weight. In further embodiments, the ratio of Formula (VI') to Formula (VII') is between about 20:80 and about 80:20 by weight. In further embodiments, the ratio of Formula (VI') to Formula (VII') is between about 35:65 and about 65:35 by weight.

In other embodiments, the resorcinol resin-blocked isocyanate composition comprises Formula (VIII'). In further embodiments, the resorcinol resin-blocked isocyanate composition comprises Formulae (VI'), (VII') and (VIII').

In some embodiments of the resorcinol resin-blocked isocyanate composition, each X of Formulae (VI) and (VIII) or Formulae (VI') and (VIII') is independently a divalent radical having Formula (C) and each Y of Formulae (VII) and (VIII) or Formulae (VII') and (VIII') is independently a divalent radical having Formula (D). In further embodiments, each X of Formulae (VI) and (VIII) or Formulae (VI') and (VIII') comprises independently at least a divalent radical having Formula (C) and/or Formula (D) and each Y of Formulae (VII) and (VIII) or Formulae (VII') and (VIII') comprises independently at least a divalent radical having Formula (A) and/or Formula (B). In a particular embodiment of the resorcinol resin-blocked isocyanate composition comprising Formulae (VI) and (VII) wherein X is a divalent radical having Formula (C); and Y is a divalent radical having Formula (D). In another particular embodiment of the resorcinol resin-blocked isocyanate composition comprising Formulae (VI') and (VII') wherein X is a divalent radical having Formula (C); and Y is a divalent radical having Formula (D).

In further instances, the resorcinol resin-blocked isocyanate composition may be obtainable or preparable by reacting the resorcinol resin with an isocyanate mixture comprising a mixture of MDI isomers such as 2,4'-MDI [i.e., O=C=N—X—N=C=O where X is Formula (C)] and 4,4'-MDI [i.e., O=C=N—Y—N=C=O where Y is Formula (D)]; a mixture of TDI isomers such as 2,4-TDI [i.e., O=C=N—X—N=C=O where X is Formula (B)] and 2,6-TDI [i.e., O=C=N—Y—N=C=O where Y is Formula (A)]; or a mixture of a MDI isomer and a TDI isomer. In some embodiments, the resorcinol resin-blocked isocyanate composition is prepared from the reaction between Formula (V) and an isocyanate mixture comprising 2,4'-MDI and 4,4'-MDI. In some embodiments, the resorcinol resin-blocked isocyanate composition comprises Formula (IX), (X), (XI) or a combination thereof:

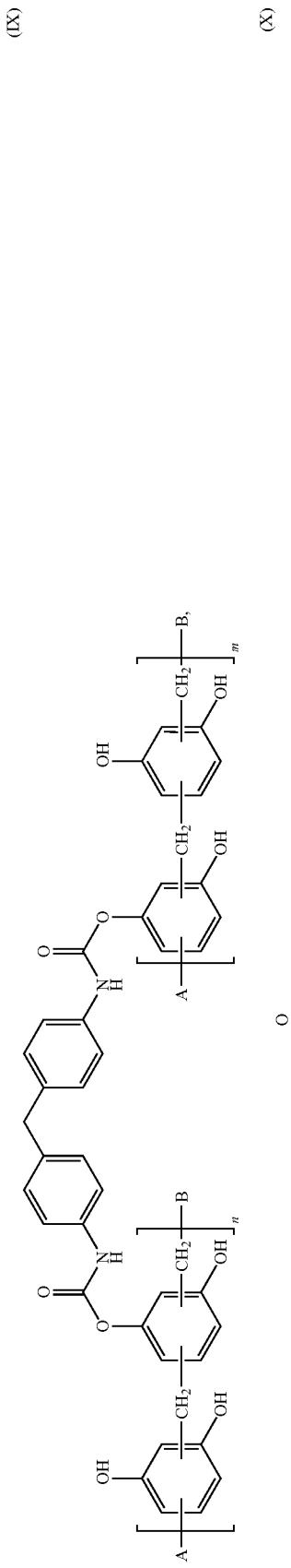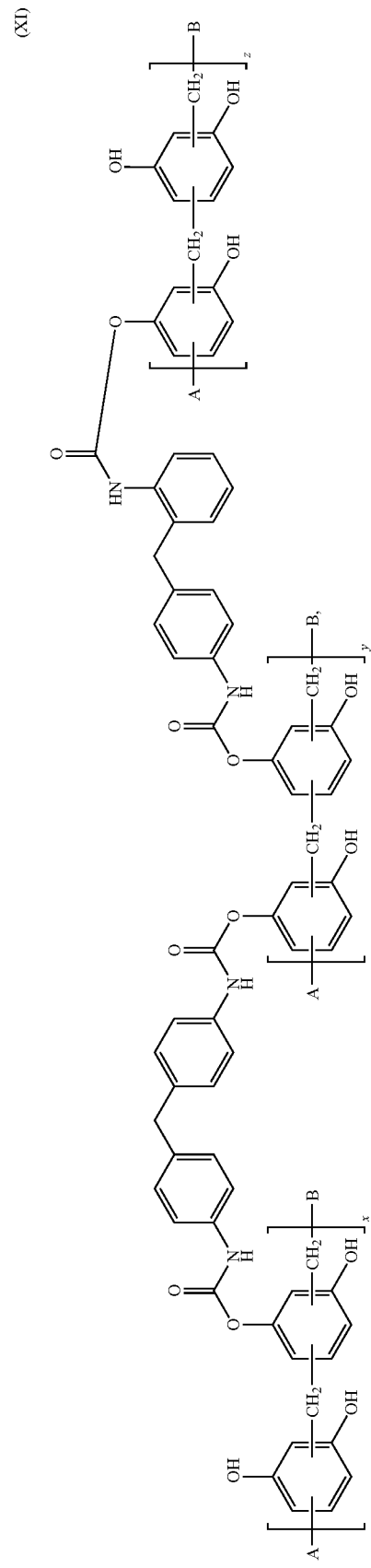

wherein A and B are as defined above; and each of x, y, z, n, m, l and k is independently a distribution of integers having an average from about 1 to about 100, from about 1 to about 50, from about 1 to about 20, or from about 1 to about 10. In some embodiments, each of Formulae (IX), (X) and (XI) is optionally and independently substituted with alkyl, aryl, alkaryl, cycloalkaryl, aralkyl, alkenyl such as unsubstituted or substituted vinyl and allyl, siloxanyl, alkynyl, acyl, carboxy, heterocyclyl, halide, nitro, hydroxy, unsubstituted or substituted methacrylate, unsubstituted or substituted acrylate, silyl ether, or a combination thereof. In other embodiments, Formula (IX), (X) or (XI) has one or more substituents. In further embodiments, Formula (IX), (X) or/and (XI) has no substituent.

In some embodiments, the resorcinol resin-blocked isocyanate composition comprises Formulae (IX) and (X). In other embodiments, the resorcinol resin-blocked isocyanate composition comprises Formula (XI). In further embodiments the resorcinol resin-blocked isocyanate composition comprises Formulae (IX), (X) and (XI). , In further instances, the resorcinol resin-blocked isocyanate composition may be prepared or obtained from the reaction between the resorcinol resin of Formula (V') wherein A is H and B has Formula (V-1) and an isocyanate mixture comprising 2,4'-MDI and 4,4'-MDI. In some embodiments, the resorcinol resin-blocked isocyanate composition comprises Formula (IX'), (X'), (XI') or a combination thereof:

wherein each of x, y, z, n, m, l and k is independently a distribution of integers having an average from about 1 to

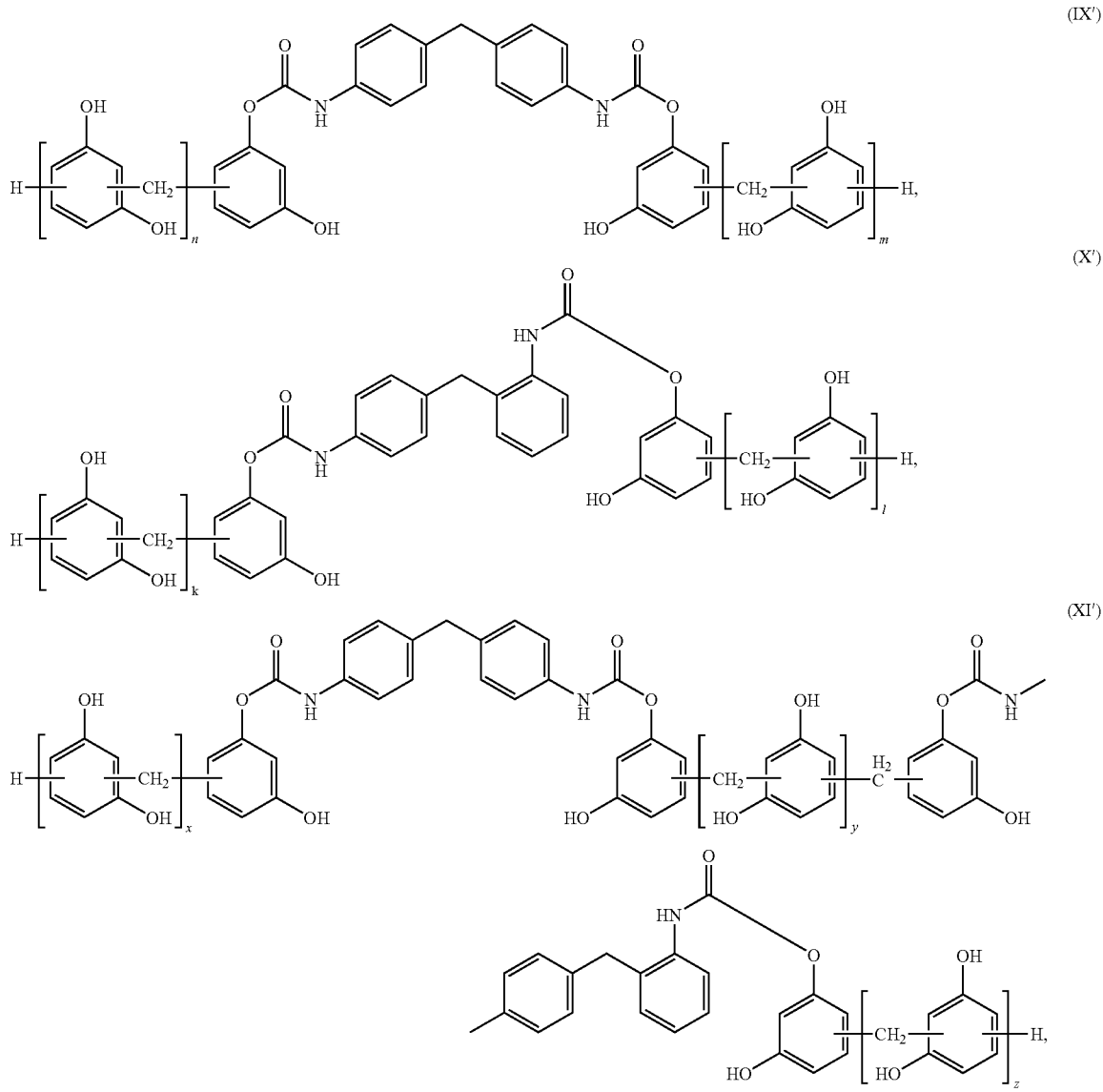

about 100, from about 1 to about 50, from about 1 to about 20, or from about 1 to about 10. In some embodiments, each of Formulae (IX'), (X') and (XI') is optionally and independently substituted with alkyl, aryl, alkaryl, cycloalkaryl, aralkyl, alkenyl such as unsubstituted or substituted vinyl and allyl, siloxanyl, alkynyl, acyl, alkoxycarbonyl, carboxy, heterocyclyl, halide, nitro, hydroxy, unsubstituted or substituted methacrylate, unsubstituted or substituted acrylate, silyl ether, or a combination thereof. In other embodiments, Formulae (IX'), (X') and/or (XI') have one or more substituents. In further embodiments, Formulae (IX'), (X') and/or (XI') have no substituent.

In some embodiments, the resorcinol resin-blocked isocyanate composition comprises Formulae (IX') and (X'). In other embodiments, the resorcinol resin-blocked isocyanate composition comprises Formula (XI'). In further embodiments, the resorcinol resin-blocked isocyanate composition comprises Formulae (IX'), (X') and (XI').

A person skill in the art can recognize that any of the phenolic acidic hydrogen of Formula (VI)-(XI) and (VI')-(XI') can be converted to other groups such as acyl, alkyl or alkenyl by known phenolic reactions. For example, each of the phenolic acidic hydrogen can be optionally and independently converted into an alkyl or alkenyl group by reacting with (1) a diazoalkane; (2) an alkyl or alkenyl halide; alkyl or alkenyl sulfate; alkyl or alkenyl sulfite in the presence of a base; or (3) an olefin in the presence of an acid catalyst. Similarly, the phenolic acidic hydrogen can be converted into an acyl group by reacting with an acyl halide or a carboxylic acid anhydride in the presence of a base.

Similarly, each of the above-mentioned phenolic acidic hydrogen can be optionally and independently functionalized or converted into a substituted or unsubstituted methacrylate or acrylate group by reacting the phenolic acidic hydrogen with the epoxy group of an epoxy compound that also comprises a methacrylate or an acrylate group. Some non-limiting examples of suitable epoxy compounds include glycidyl methacrylate, and glycidyl acrylate, both of which can be obtained from a commercial supplier such as Aldrich, Milwaukee, Wis. A possible reaction between the resorcinol resin-blocked isocyanate of Formula (A) where X is as defined above with glycidyl methacrylate is shown below.

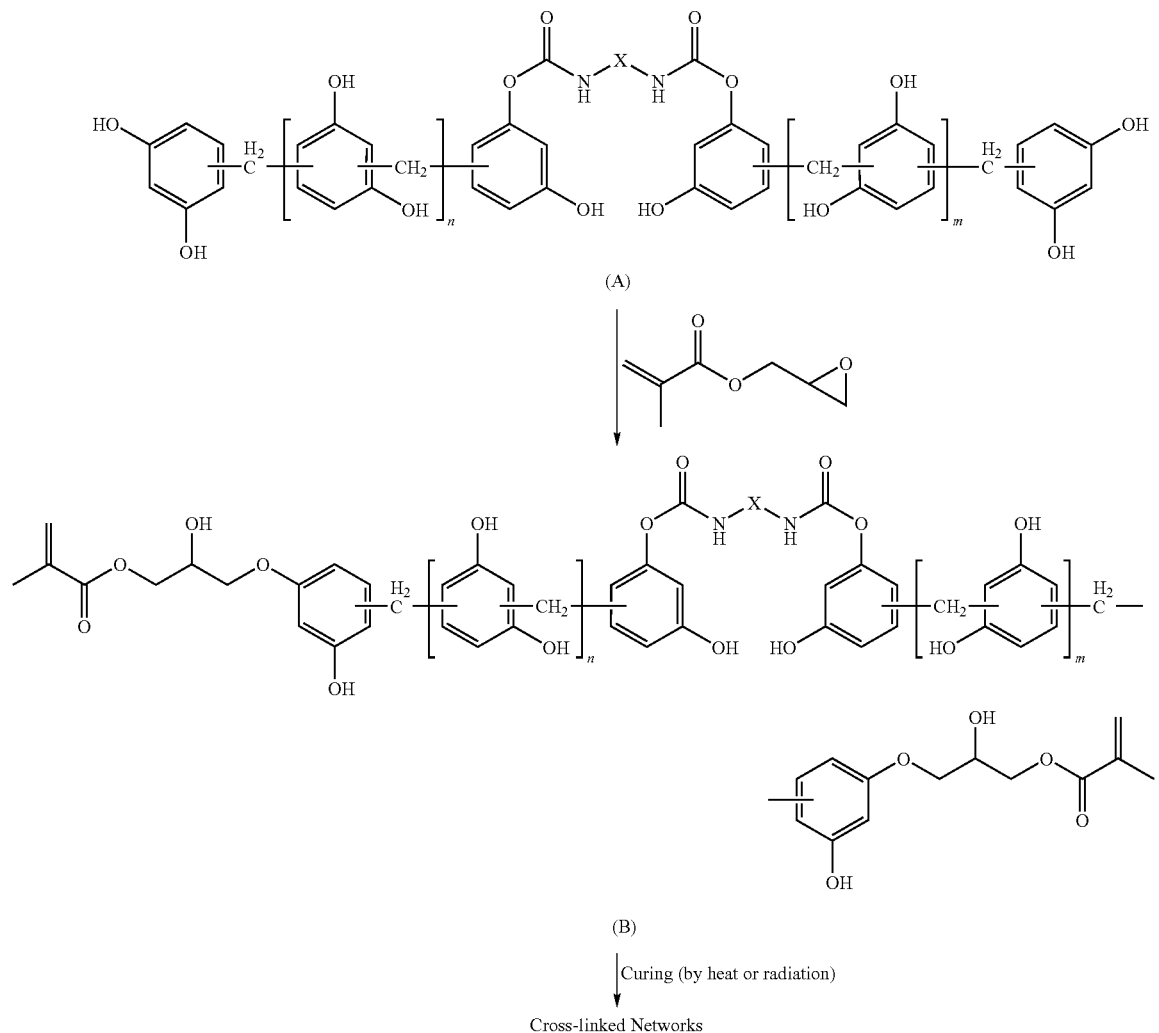

Alternatively, each of the phenolic acidic hydrogen can be optionally and independently converted into a substituted or unsubstituted methacrylate or acrylate group by reacting the phenolic acidic hydrogen with substituted or unsubstituted methacryloyl halide or acryloyl halide. Some non-limiting examples of suitable substituted or unsubstituted methacryloyl halide or acryloyl halide include acryloyl chloride, 3,3-dimethylacryloyl chloride, methacryloyl chloride, crotonoyl chloride, and cinnamoyl chloride, all of which can be obtained from commercial suppliers such as Aldrich, Milwaukee, Wis. A possible reaction between the resorcinol resin-blocked isocyanate of Formula (A) where X is as defined above with acryloyl chloride is shown below.

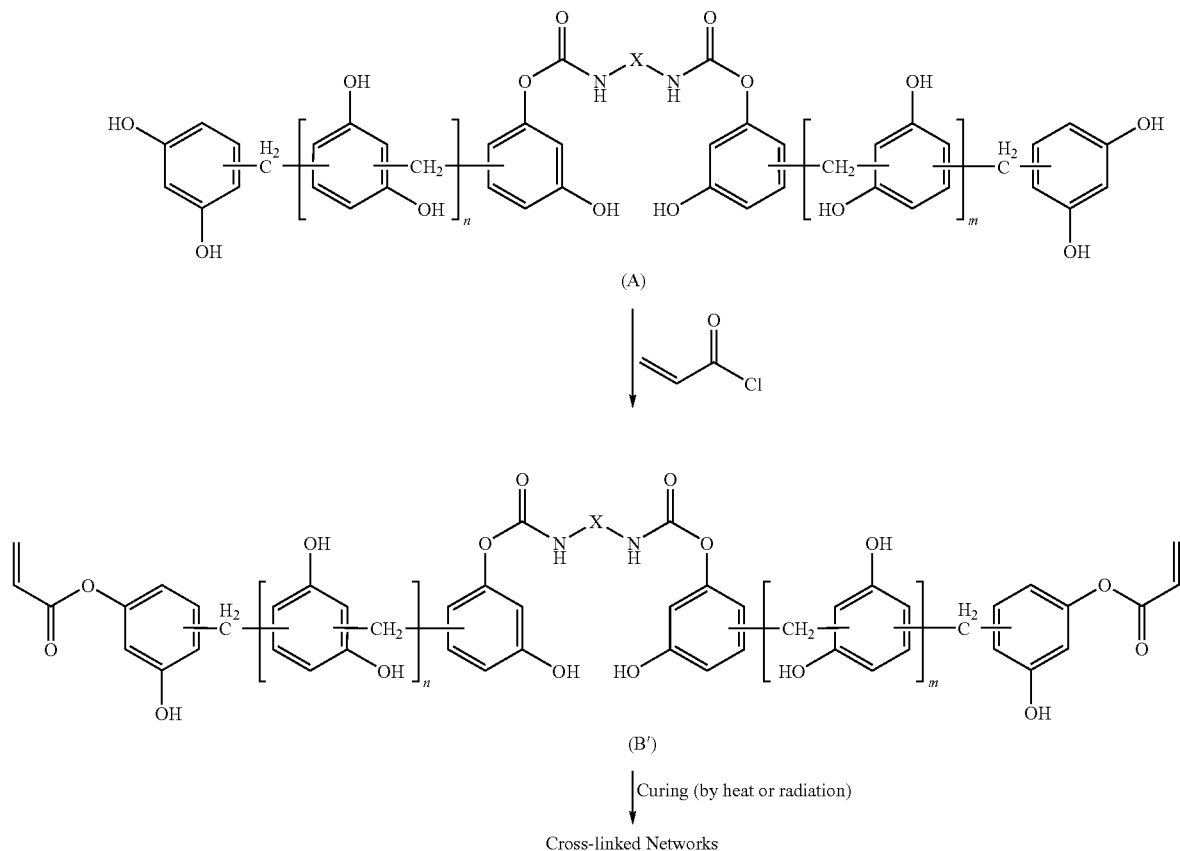

Further, each of the above-mentioned phenolic acidic hydrogen can be optionally and independently functionalized or converted into a substituted or unsubstituted alkene by reacting the phenolic acidic hydrogen with the isocyanate of an isocyanate compound that also comprises an alkenyl group. A non-limiting examples of suitable isocyanate compound includes 3-isopropenyl-alpha,alpha-dimethylbenzyl isocyanate, which can be obtained from a commercial supplier such as Aldrich, Milwaukee, Wis. A possible reaction between the resorcinol resin-blocked isocyanate of Formula (A) where X is as defined above with 3-isopropenyl-alpha,alpha-dimethylbenzyl isocyanate is shown below.

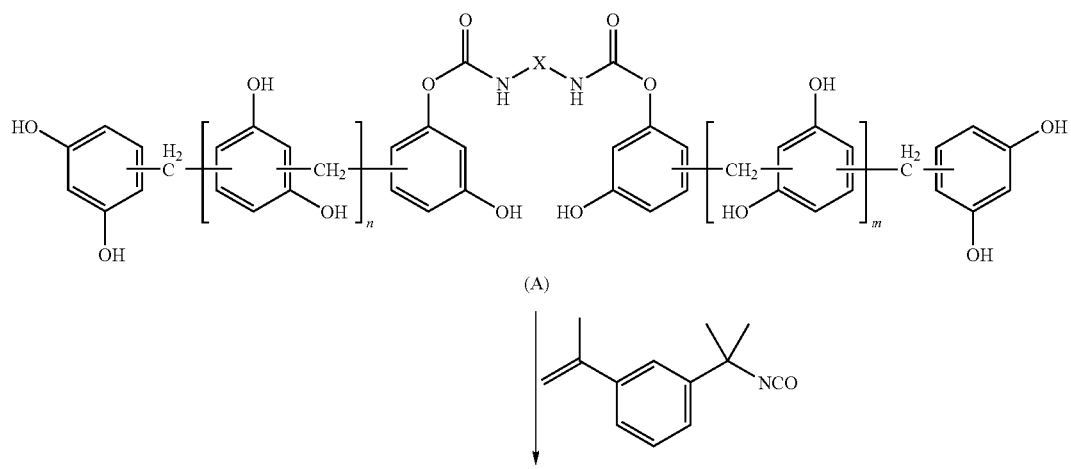

-continued

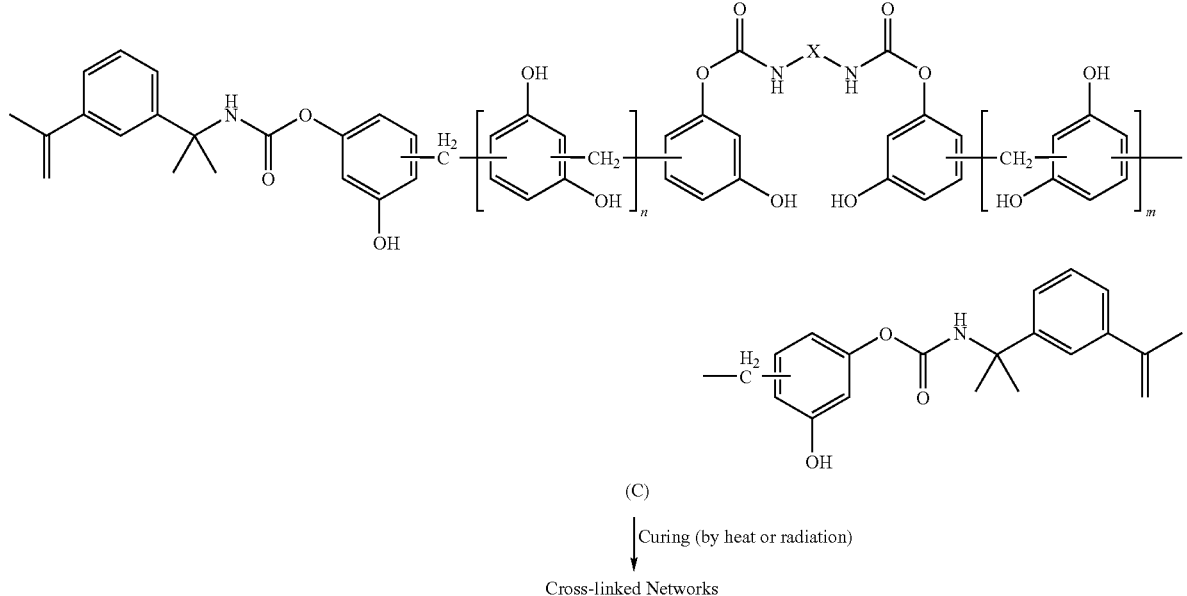

(C)

Curing (by heat or radiation)

Cross-linked Networks

The above-mentioned functionalized methacrylate, acrylate and alkenyl, compounds such as those represented by Formulae (B), (B') and (C) can be cross-linked by heat or radiation, such as UV light and e-beam, in the presence or absence of an initiator to form a resin or polymeric material that can be used as a binder in various coating formulations. Some non-limiting examples of suitable initiators include peroxides such as acyl peroxides (e.g., acetyl and benzoyl peroxides), alkyl peroxides (e.g., t-butyl peroxide and cumyl peroxide), hydroperoxides (e.g., t-butyl hydroperoxide and cumyl hydroperoxide), peresters (e.g., t-butyl perbenzoate), azo compounds (e.g., 2,2'-azobisisobutyronitrile), disulfides, tetrazenes and combinations thereof. Further, compounds represented by Formula (B) can be cured by any of the diisocyanates or polyisocyantes disclosed herein. Optionally, the coating formulations may comprise one or more suitable additives such as solvents, fillers, rheology modifiers, thickeners, surfactants, wetting agents, cross-linking agents, coupling agents, colorants, lubricants, leveling agents, antioxidants, UV stabilizers, plasticizers, and the like.

Further, each of the above-mentioned phenolic acidic hydrogen can be optionally and independently functionalized or converted into an alkyl, aryl, aralkyl, vinyl, siloxanyl, or silyl ether group by reacting the phenolic acidic hydrogen with the epoxy group of an epoxy compound that also comprises an alkyl, aryl, aralkyl, vinyl, siloxanyl, or silyl ether group respectively. These functionalized alkyl, aryl, aralkyl, vinyl, siloxanyl, or silyl ether compounds can be used in various coating applications. The chemistry of the phenolic acidic hydrogen is described in Zvi Rappoport, "*The Chemistry of Phenols*," John Wiley & Sons, pp. 199-258, 605-660 and 1015-1106 (2003), which is incorporated herein by reference in its entirety. A possible reaction between the resorcinol resin-blocked isocyanate (A) where X is as defined above with an epoxy compound (D) where R is alkyl, aryl, aralkyl, vinyl, siloxanyl, or silyl ether is shown below.

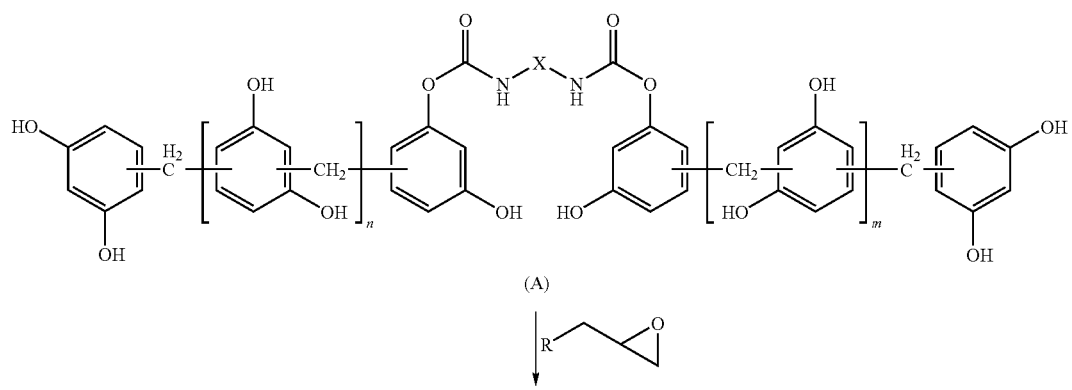

-continued

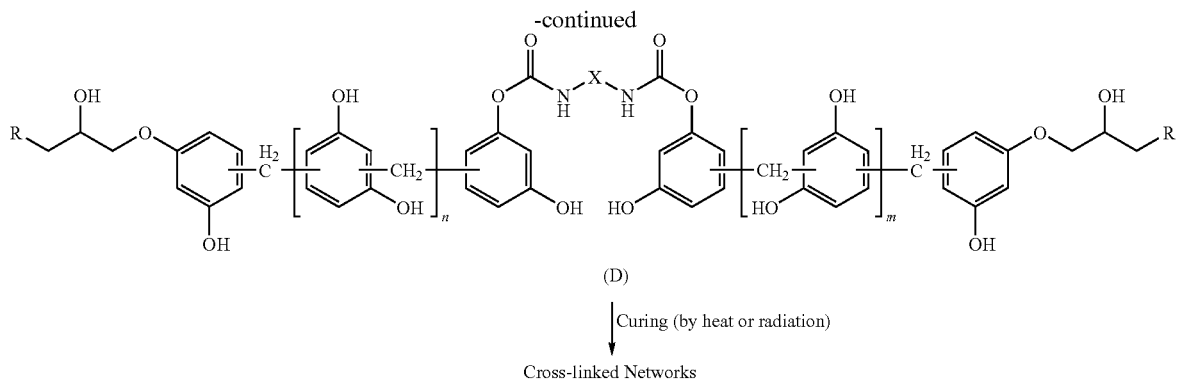

(D)

| Curing (by heat or radiation)

Cross-linked Networks

The above-mentioned functionalized alkyl, aryl, aralkyl, vinyl, siloxanyl, and silyl ether compounds such as those represented by Formula (E) can be cross-linked by a curing agent, such as the diisocyanates and polyisocyantes disclosed herein, to form a resin or polymeric material that can be used as a binder in various coating formulations. Optionally, the coating formulations may comprise one or more suitable additives such as solvents, fillers, rheology modifiers, thickeners, surfactants, wetting agents, cross-linking agents, coupling agents, colorants, lubricants, leveling agents, antioxidants, UV stabilizers, plasticizers, and the like.

The resorcinol resin-blocked isocyanate composition can be used as a methylene acceptor in rubber composition formulations. Any rubber or rubber material, such as a natural rubber, a synthetic rubber or a combination thereof, can be used for the rubber composition disclosed herein. Non-limiting examples of suitable synthetic rubber polymers include the butadiene polymers such as polybutadiene, isobutylene rubber (butyl rubber), ethylene-propylene rubber (EPDM), neoprene (polychloroprene), polyisoprene, copolymers of 1,3-butadiene or isoprene with monomers such as styrene, acrylonitrile and methyl methacrylate as well as ethylene/propylene/diene monomer (EPDM) and in particular ethylene/propylene/dicyclopentadiene terpolymers. Non-limiting examples of suitable butadiene polymers include those polymers having rubber-like properties, prepared by polymerizing butadiene alone or with one or more other polymerizable ethylenically unsaturated compounds, such as styrene, methylstyrene, methyl isopropenyl ketone and acrylonitrile. The butadiene may be present in the mixture in an amount of at least 40% of the total polymerizable material.

Any suitable methylene donor known in the art can be optionally added to the rubber composition. Generally, methylene donors are capable of generating formaldehyde by heating during the vulcanization of the rubber material. Non-limiting examples of suitable methylene donors include hexamethylenetetramine (HMTA), di- to hexamethylolmelamines or completely or partially etherified or esterified derivatives thereof, for example, hexamethoxy methylmelamine (HMMM), oxazolidine derivatives, N-methyl-1,3,5-dioxazine and the like.

In addition to the resorcinol resin-blocked isocyanate disclosed herein being used as a first methylene acceptor in the rubber composition, a second suitable methylene acceptor that can react with formaldehyde can be optionally added to the rubber composition. Some non-limiting examples of suitable second methylene acceptors include resorcinol resin-blocked isocyanate compositions; various resorcinol-formaldehyde resins such as PENACOLITE® resins B-16 and B-1A; PENACOLITE® resins B-18-S, B-19-S and B-19-M; and PENACOLITE® resins B-20-S and B-21-S. All of the above-mentioned PENACOLITE® resins are commercially available from INDSPEC Chemical Corporation, Pittsburgh, Pa. In some embodiments, the methylene acceptor is the resorcinol resin-blocked isocyanate composition disclosed herein, without the second methylene acceptor. In other embodiments, the second methylene acceptor is present and may be PENACOLITE® B-20-S. In further embodiments, the first methylene acceptor is incorporated into the rubber component in an amount from about 1 to 5 parts by weight based on 100 parts by weight of the rubber component (i.e., 1 to 5 phr).

Generally, the weight ratio of methylene acceptor to methylene donor is from about 1:10 to 10:1, more preferably 1:3 to 3:1. When the methylene donor is HMTA, the weight ratio is preferably at least about 2:1.

The rubber composition may include a cross-linking or vulcanizing agent such as sulfur. Examples of suitable sulfur vulcanizing agents include elemental sulfur or sulfur donating vulcanizing agents. In some embodiments, the sulfur vulcanizing agent is elemental sulfur. Other cross-linking agents may also be used.

The rubber composition may also include one or more additives such as carbon black, zinc oxide, silica, antioxidants, stearates, accelerators, oils, adhesion promoters, cobalt salts, stearic acid, fillers, plasticizers, waxes, processing oils, retarders, antiozonants and the like. Accelerators can be used to control the time and/or temperature required for the vulcanization and to improve the properties of the vulcanizate. Suitable accelerators include, but are not limited to, amines, disulfides, guanidines, thioureas, thiazoles, thiurams, sulfenamides, dithicarbonates and zanthates. In some embodiments, the primary accelerator is a sulfenamide such as N,N-dicylohexyl-2-benzenethiazole sulfenamide. Any cobalt compound that can promote the adhesion of rubber material to metal, such as stainless steel, may be used. Suitable cobalt compounds include, but are not limited to, cobalt salts of fatty acids and other carboxylic acids, such as stearic acid, palmitic, oleic, linoleic, and the like; cobalt salts of aliphatic or alicyclic carbocylic acids having 6 to 30 carbon atoms such as cobalt neodecanoate; cobalt salts of aromatic carbocylic acids such as cobalt naphthenate; cobalt halides such as cobalt chloride; and organo-cobalt-boron complexes such as MANOBOND® 680C from OM Group, Inc., Cleveland, Ohio.

The rubber composition can be prepared by mixing a rubber material, carbon black, zinc oxide, lubricants and a methylene acceptor in a Banbury mixer at a temperature of about 150° C. The resulting masterbatch is then compounded on a standard 2-roll rubber mill with at least a sulfur accelerator and a methylene donor. Next, the rubber composition can be shaped and cured. Other methods of preparing of rubber compositions and their formulations are described in U.S. Pat. Nos. 6,875,807; 6,605,670; 6,541,551; 6,472,457; 5,945,500; and 5,936,056; all of which are incorporated herein by reference.

In some embodiments, the rubber composition is a vulcanizable rubber composition comprising (a) a rubber material, (b) a methylene donor compound which generates formaldehyde by heating; (c) a methylene acceptor which is or comprises the resorcinol resin-blocked isocyanate composition disclosed herein; and (d) a cross-linking or vulcanizing agent. In further embodiments, the rubber material is natural rubber, styrene-butadiene rubber, butadiene rubber, isoprene rubber, acrylonitrile-butadiene rubber, chloroprene rubber, butyl rubber, halogenated butyl rubber, ethylene-propylene-diene monomer (EPDM) rubber, or a mixture thereof.

In some embodiments, the vulcanizable rubber composition further comprises a rubber reinforcing material. Any rubber reinforcing material that can strengthen rubbers can be used, including, but not limited to, polyesters, polyamides (e.g., nylons and aramid), polyvinyl alcohol, carbon, glass, steel (brass, zinc or bronze plated), polybenzoxazole, rayon, and other organic or inorganic compositions. These rubber reinforcing materials may be in the form of filaments, fibers, cords, or fabrics. In some embodiments, the rubber reinforcing material can be a steel cord coated by brass, zinc, bronze or a combination thereof.

While not necessary, the rubber reinforcing material can be coated with an adhesive composition before it is combined with an uncured rubber composition. Any adhesive composition that can enhance the adhesion between the reinforcing material and the cured rubber component can be used. For examples, certain suitable adhesive compositions for enhancing the adhesion between rubber material and a rubber reinforcing material are disclosed in U.S. Pat. Nos. 6,416,869; 6,261,638; 5,789,080; 5,126,501; 4,588,645; 4,441,946; 4,236,564; 4,051,281; 4,052,524; and 4,333,787, which are incorporated herein by reference in their entirety. These adhesive compositions can be used according to the methods taught therein, with or without modifications.

Fabricated articles can be made from the vulcanizable rubber composition disclosed herein. Non-limiting examples of the fabricated article include tires, belts such as power transmission belts, conveyor belts and V-belts, hoses such as pneumatic and hydraulic hoses, printing rolls, rubber shoe heels, rubber shoe soles, automobile floor mats, truck mud flaps and ball mill liners.

In some embodiments, the fabricated rubber article can be prepared according to the following method which comprises the steps of (1) obtaining a vulcanizable rubber composition as described above mixed with a cross-linking agent; (2) embedding in the vulcanizable rubber composition a rubber reinforcing material; and (3) effecting cross-linking of the rubber composition, wherein the reinforcing material is embedded in the vulcanizable rubber composition before the cross-linking.

The resorcinol resin-blocked isocyanate composition disclosed herein can also be used to prepare various dipping formulations for treating rubber reinforcing materials. In some embodiments, the dipping formulation comprises the resorcinol resin-blocked isocyanate composition without a resorcinol-formaldehyde-latex. In other embodiments, the dipping formulation is a single dipping (i.e., single step) or double dipping (i.e., double step) formulation further comprising a resorcinol-formaldehyde-latex (RFL) for various industrial applications. For example, either the single or double dipping RFL formulation can be used to treat rubber reinforcing materials used in rubber compositions. Any rubber reinforcing material known in the art can be used, including, but not limited to, polyesters, polyamides (e.g., nylons and aramid), polyvinyl alcohol, carbon, glass, polybenzoxazole, rayon, and other organic or inorganic compositions. These rubber reinforcing materials may be in the form of filaments, fibers, cords, or fabrics.

After the rubber reinforcing materials are treated with dipping RFL formulation comprising a resorcinol resin-blocked isocyanate composition and a resorcinol-formaldehyde-latex, the treated rubber reinforcing materials can be heat-treated or cured in an oven or the like at an elevated temperature. The elevated temperature may be from about 50° C. to about 200° C. The heat-treatment may cause the unblocking of the resorcinol resin-blocked isocyanate composition to form the isocyanates blocked by the resorcinol resin. The isocyanates in turn may react with the resorcinol-formaldehyde-latex at the elevated temperature to form a cross-linked resorcinol-formaldehyde-latex.

The adhesive properties provided by a single or double dipping formulation, such as the H-pull adhesion properties, can be improved by using the resorcinol resin-blocked isocyanate composition disclosed herein in the formulation. In a single dipping formulation, the resorcinol resin-blocked isocyanate of the invention is used as an additive to the standard RFL formulation. Optionally, the resorcinol resin-blocked isocyanate can be used as the sole resorcinol source in the RFL formulation. Furthermore, the resorcinol resin-blocked isocyanate can be used as the sole ingredient in the dipping formulation. In a double dipping formulation, the resorcinol resin-blocked isocyanate is used in the first dip, often with other materials such as a solvent, a thickener, an epoxy, and the like, followed by a conventional RFL formulation as the second dip. In some applications, such as in power transmission belts, the resorcinol resin-blocked isocyanate dip is the only treatment; the second, RFL treatment is not used. The H-pull adhesion properties, such as % of rubber coverage, peak load, energy required for the test, and % of broken cords, can be measured according to ASTM D 4776. The samples can be vulcanized and tested for unaged condition, steam-aged condition and/or humidity-aged condition. In resorcinol-formaldehyde-latex (RFL) formulations, the resorcinol resin-blocked isocyanate composition can replace phenol-blocked or caprolactam-blocked isocyanates either partially or completely. Also, if the resorcinol resin-blocked isocyanate composition partially replaces an R/F resin in the formulation, the flexibility of the formulation may be improved due to the replacement of some of the rigid methylene bridged structures with flexible longer chain bridged resorcinol.

In some single dip methods, an aqueous alkaline dipping formulation can be made by mixing a resin solution, such as a resorcinolic novolak resin solution, with sufficient water to reduce the concentration of resin solids to less than about 10 weight %. The pH adjustment can be made by the addition of an aqueous caustic solution. An alkaline substance, such as sodium hydroxide or ammonium hydroxide can be added to the dip to adjust the pH to about 7.0 to about 12.0. After adjusting the solution pH, an aqueous formaldehyde solution may be added. A synthetic rubber latex can then be added to the resin solution. The RFL dip thus prepared can be ready for an immediate use, but dips generally show better results if they are aged for about 16 to 24 hours at room temperature prior to use. In the preparation of a single dipping formulation, the resorcinol resin-blocked isocyanate composition disclosed herein can be used as an adhesion promoter. Optionally, other adhesion promoters, such as polyepoxide compounds, other blocked isocyanate compounds or ethylene-urea compounds, may be employed. Generally, the adhesion promoters in the RFL may improve the bonding of the rubber material to the rubber reinforcing material by surface diffusion or penetration, or by chemical and physical interactions.

The rubber latex used in the dip may be a natural rubber latex, a styrene-butadiene rubber latex, an acrylonitrile-butadiene rubber latex, a chloroprene rubber latex and a vinylpyridine-styrene-butadiene rubber latex. These latices can be used alone or as mixtures. There is no limitation on the type of rubber latex use in the dipping formulation. In general, vinylpyridine-styrene-butadiene copolymer latices are preferably used as the main rubber component of the rubber latex.

In some single dip treatments, no resorcinol-formaldehyde-latex is used. The single dipping formulation may contain only the resorcinol resin-blocked isocyanate disclosed herein and optionally a solvent. Further, this type of single dipping formulation may optionally contain an epoxy-containing compound, a thickener, an antifoam or one or more other additives. Generally, the adhesion of rubber reinforcing materials such as cords and fabrics to rubber materials may be enhanced by dipping the rubber reinforcing materials in such a single dipping formulation without a resorcinol-formaldehyde-latex.

In the double dip method, the rubber reinforcing materials are treated with the first dip solution comprising the resorcinol resin-blocked isocyanate composition disclosed herein. Optionally, other adhesion promoters, such as polyepoxide compounds, other blocked isocyanate compounds or ethylene-urea compounds, may be employed. The polyepoxide compounds suitable for use generally comprise molecules containing one or more epoxy groups and may include epoxy compounds made from glycerol, pentaerythritol, sorbitol, ethylene glycol, polyethylene glycol and resorcinol. In some embodiments, the polyepoxide compounds are the polyepoxides of polyalcohols. In other embodiments, the blocked isocyanate is selected from lactams, phenols and oximes blocked isocyanates comprising toluene diisocyanate, metaphenylene diisocyanate, diphenylmethane diisocyanate, triphenylmethane triisocyanate and hexamethylene diisocyanate. This first dip treatment generally can activate the fiber surface to enhance the interaction with the second dip solution, i.e. the RFL formulation. The further use of the resorcinol resin-blocked isocyanate composition disclosed herein in the RFL of a double dipping formulation can further improve the adhesion of the rubber reinforcing material to rubber compounds.

The single dip or double dipping formulation can be used for various applications. For example, they can be used to bond polyester tire cords to rubber material with improved results than the conventional formulation.

In one process for adhering polyester cords to rubber compounds, a conventional dipping machine is employed whereby the cords are continuously drawn through a dip bath containing the one step dipping formulation prepared using the resin made in accordance with embodiments of the invention. The excess dip is removed by blowing the cord with air jets and then dried the cord in an oven set at 170° C. for 120 seconds. Then the cords are cured at 230° C. for a sufficient time necessary for the penetration of the dip into the polyester cord. An acceptable cure time of about 60 seconds has been found to be suitable.

In the process of testing the successful bonding of polyester cords to rubber material, the adhesive treated cords are embedded in a formulated and uncured rubber compound and then the rubber compound is vulcanized for a sufficient time and pressure to promote good adhesion. The H-pull adhesion test has been employed to determine the static adhesion of textile tire cords to rubber. This test is specified as ASTM D-4776 method and is used for testing purposes.

Though the adhesive containing polyester reinforcing fibers or cords can be adhered to a rubber such as vulcanizable compounds of natural rubber, polybutadiene rubber and rubbery butadiene-styrene copolymer, it is understood that polyester reinforcing fibers or cords can also be adhered to other vulcanizable rubbery materials from the group comprising nitrile rubbers, chloroprene rubbers, polyisoprenes, acrylic rubbers, ethylene-propylene-diene monomer (EPDM) rubber and isoprene-acrylonitrile rubbers. These rubbers prior to curing can be mixed with the usual compounding ingredients comprising sulfur, stearic acid, zinc oxide, accelerators, antioxidants, antiozonants, and other curatives.

Polyester fibers, yarns, filaments, cords or fabric coated with the dipping formulations comprising the resorcinol resin-blocked isocyanate composition disclosed herein can be used in the manufacture of radial, bias, or belted-bias passenger tires, truck tires, motorcycle or bicycle tires, off-the-road tires, airplane tires, transmission belts, V-belts, conveyer belts, hose, and gaskets.

In addition to their use as ingredients in rubber compounding and fabric dipping formulations, the resorcinol resin-blocked isocyanate composition disclosed herein could be used in various curing reactions involving the phenolic hydroxyl groups, particularly with a reactive ring group such as epoxy ring. Non-limiting examples of suitable reactive ring groups include heterocyclic ring groups that have a higher strain energy than their corresponding open-ring structures. The conventional definition of strain energy is that it represents the difference in energy between the actual molecule and a completely strain-free molecule of the same constitution. More information about the origin of strain energy can be found in the article by Wiberg et al., "A Theoretical Analysis of Hydrocarbon Properties: II Additivity of Group Properties and the Origin of Strain Energy," *J. Am. Chem. Soc.* 109, 985 (1987), which is incorporated herein by reference. The heterocyclic ring group may have 3, 4, 5, 7, 8, 9, 10, 11, or 12 members, in further embodiments 3, 4, 5, 7, or 8 members, in some embodiments 3, 4, or 8 members, and in additional embodiments 3 or 4 members. Non-limiting examples of such heterocyclic ring are cyclic ethers (e.g., epoxides and oxetane), cyclic amines (e.g., aziridine), cyclic sulfides (e.g., thiirane), cyclic amides (e.g., 2-azetidinone, 2-pyrrolidone, 2-piperidone, caprolactam, enantholactam, and capryllactam), N-carboxy-α-amino acid anhydrides, lactones, and cyclosiloxanes. The chemistry of the above heterocyclic rings is described in George Odian, "Principle of Polymerization," second edition, Chapter 7, p. 508-552 (1981), which is incorporated herein by reference.

In additional examples, the reactive ring may be a 5- or 7-membered ring comprising a —COO— group or a —CONR— group, such as butyrolactone, N-methylbutyrolactam, N-methylcaprolactam, and caprolactone.

In some embodiments, the non-functionalized or functionalized resorcinol resin-blocked isocyanate composition prepared from a diisocyanate or polyisocyanate compound can be used as a masked diisocyanate or polyisocyanate compound. The masked diisocyanate or polyisocyanate compound can react upon heating with a difunctional compound such as a diol, a dithiol, a diamine, a dicarboxylic acid, a hydroxylamine, an amino acid, a hydroxyl acid, a thiol acid, a hydroxythiol, or a thioamine to form a polymeric material or article. For example, when a diol or diamine is used, a polyurethane or a polyurea material may form respectively. Non-limiting examples of suitable dithiols are 3,6-dioxa-1,8-octanedithiol, erythro-1,4-dimercapto-2,3-butanediol, (±)-threo-1,4-dimercapto-2,3-butanediol, 4,4'-thiobisbenzenethiol, 1,4-benzenedithiol, 1,3-benzenedithiol, sulfonyl-bis(benzenethiol), 2,5-dimercapto-1,3,4-thiadiazole, 1,2-ethanedithiol, 1,3-propanedithiol, 1,4-butanedithiol, 2,3-butanedithiol, 1,5-pentanedithiol, and 1,6-hexanedithiol. Non-limiting examples of suitable diols are 2,2'-bi-7-naphthol, 1,4-dihydroxybenzene, 1,3 dihydroxybenzene, 10,10-bis(4-hydroxyphenyl)anthrone, 4,4'-sulfonyldiphenol, bisphenol, 4,4'-(9-fluorenylidene)diphenol, 1,10-decanediol, 1,5-pentanediol, diethylene glycol, 4,4'-(9-fluorenylidene) bis(2-phenoxyethanol), bis(2-hydroxyethyl)terephthalate, bis[4-(2-hydroxyethoxy)phenyl]sulfone, hydroquinone-bis (2-hydroxyethyl)ether, and bis(2-hydroxyethyl)piperazine. Non-limiting examples of suitable diamines are diaminoarenes such as 1,4-phenylenediamine, 4,4-diaminobenzophenone and 4,4-diaminodiphenyl sulfone, and diaminoalkanes such as 1,2-ethanediamine and 1,4-butanediamine, dibenzo [b,d]furan-2,7-diamine, and 3,7-diamino-2(4),8-dimethyldibenzothiophene 5,5-dioxide. Non-limiting examples of suitable dicarboxylic acids are phthalic acid, terephthalic acid, adipic acid, and 4,4'-biphenyldicarboxylic acid. Non-limiting examples of suitable hydroxylamines are p-aminophenol and fluoresceinamine. Non-limiting examples of suitable amino acids are 4-aminobutyric acid, phenylalanine, and 4-aminobenzoic acid. Non-limiting examples of suitable hydroxyl acids are salicylic acid, 4-hydroxybutyric acid, and 4-hydroxybenzoic acid. Non-limiting examples of suitable hydroxythiols are monothiohydroquinone and 4-mercapto-1-butanol. A non-limiting example of a suitable thioamine is p-aminobenzenethiol. Non-limiting examples of suitable thiol acids are 4-mercaptobenzoic acid and 4-mercaptobutyric acid. Almost all of the above bridging compounds are available commercially from Aldrich Chemicals and other chemical suppliers.

Further, the functionalized resorcinol resin-blocked isocyanate composition may contain useful functional groups such as hydroxyl, carboxyl, amine, epoxy, that may be used for other applications such as coatings and composites. The functionalized methacrylate or acrylate, alkenyl, alkyl, aryl, vinyl, aralkyl, siloxanyl and silyl ether compounds such as compounds of Formulae (B), (B'), (C), and (E) mentioned previously may also be cross-linked to form a resin or polymeric materials suitable for various coating applications.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Example 1

Into a 500 ml reaction kettle equipped with a mechanical stirrer, a thermometer, an addition funnel, and a reflux condenser, 143.1 grams (1.3 mole) of resorcinol was charged and heated to about 120° C. to 130° C. to melt the resorcinol. Then, 65.9 grams (0.806 mole) of an aqueous formaldehyde (36.7%) solution was added slowly into the molten resorcinol at about 95 to 120° C. temperature conditions for about 1 to 2 hours. After the formaldehyde addition, the reaction mixture was refluxed for about 30 to 60 minutes. Then, oxalic acid (1.7 gram, catalyst) was added and the water present in the reaction mixture was distilled under vacuum (at about 26-28" Hg and about 155 to 160° C.). After completing the dehydration of resorcinol-formaldehyde reaction product (RF resin), 4.3 grams (0.0172 mole) of MONDUR® ML (comprising mainly a mixture of 2,4'- and 4,4'-diphenylmethane diisocyanate available from Bayer Corporation, Pittsburgh, Pa., USA) was added slowly into the molten RF resin over a period of about 15 to 45 minutes at 150 to 160° C. temperature conditions. The stirring was continued for about 15 to 30 minutes at 150 to 160° C. to complete the reaction of MONDUR® ML with the RF resin.

Next, 159.8 grams of distilled water was added very slowly into the MONDUR® ML-modified RF resin over a period of about 1 to 2 hours at 90 to 125° C. with constant stirring. After the addition of water, the reaction mixture appeared as a homogeneous dark reddish solution. The pH of this MONDUR® ML-modified RF resin solution was adjusted to about 7 to 9 by the addition of 40% aqueous sodium hydroxide solution. Finally, the solution was cooled and stored.

The process flow diagram outlining the synthesis of MONDUR® ML-modified RF resin solution is shown in FIG. 1.

The pH measurement made on the final reaction mixture showed a value of 7.6. The solution viscosity of this material, measured using a Brookfield viscometer model LV at 23° C. with a #4 spindle, showed a value of 120 centipoise (cps). Liquid chromatographic (LC) and gas chromatographic (GC) determinations showed that the reaction mixture contained 8.6 weight percent unreacted (free) resorcinol.

The liquid resin obtained from the reaction of resorcinol, formaldehyde and Mondur ML was examined by FT-IR and proton/carbon-13 NMR for structural analysis and characterization. The sample exhibited infrared absorption characteristic of a mixture of water, RF resin, unreacted resorcinol and urethane structures. The urethane structure was observed as a weak carbonyl absorption near 1716 wave numbers. No unreacted isocyanate structure was detected.

The proton NMR data of Example 1 indicated the structural results listed in Table 1 below.

TABLE 1

| | |
|---|---|
| Aromatic protons per resorcinol ring | 2.79 |
| Methylene bridges per resorcinol ring | 1.21 |
| Formaldehyde/resorcinol (mole) | 0.61 |

Figure 2:
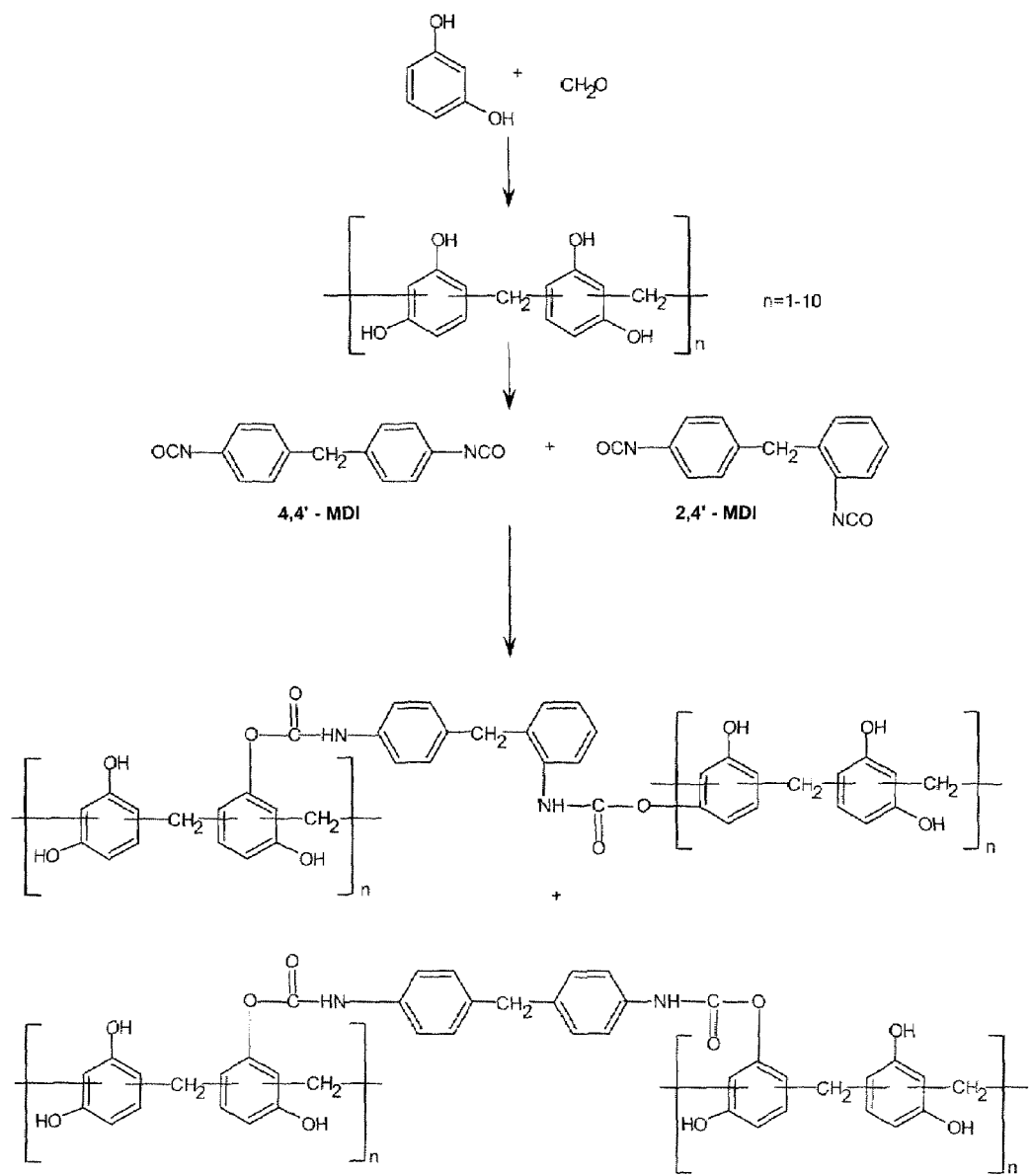
FIG. 2 depicts the chemical reaction steps of preparing a resorcinol resin-blocked isocyanate composition derived from resorcinol, formaldehyde and a mixture of 2,4'- and 4,4'-MDI.

Based on FT-IR and NMR characterization data, some possible chemical structures that could have been produced from the reaction between MONDUR® ML and the RF resin include, but are not limited to, Formulae (IX), (X), (XI), (IX'), (X'), (XI'), and those schematically shown in FIG. 2.

Examples 2-5

Examples 2-5 were prepared according to the synthesis procedure outlined in Example 1 and FIG. 1, with the exception of Example 4 in which the catalyst was neutralized by a stoichiometric amount of caustic at the end of the dehydration step, prior to reaction with the isocyanate mixture. Their formulations are shown in Table 2 below.

TABLE 2

Synthesis of Resorcinol-Formaldehyde (RF) Resin-Blocked MONDUR ® ML Solutions

| | Example | | | | | | | | | |
|---|---|---|---|---|---|---|---|---|---|---|
| | 1 | | 2 | | 3 | | 4 | | 5 | |
| | MONDUR ® ML (wt. %)* | | | | | | | | | |
| | 3 | | 6 | | 10 | | 10 | | 10 | |
| Reactants | Mole | Grams | Mole | Grams | Mole | Grams | Mole | Grams | Mole | Grams |
| Resorcinol | 1.3 | 143.1 | 1.3 | 143.1 | 1.3 | 143.1 | 5.2 | 572.5 | 1.3 | 143.1 |
| Formaldehyde (37%, aq.) | 0.806 | 65.9 | 0.806 | 65.9 | 0.806 | 65.9 | 3.22 | 275.6 | 0.806 | 65.9 |
| Oxalic Acid (catalyst) | — | 1.7 | — | 1.7 | — | 1.7 | — | 6.8 | — | 1.7 |
| MONDUR ® ML | 0.0172 | 4.3 | 0.034 | 8.6 | 0.057 | 14.3 | 0.229 | 57.3 | 0.057 | 14.3 |
| Water | — | 159.8 | — | 163.8 | — | 168.8 | — | 558.8 | — | 139.7 |
| | RF Resin Solution Properties | | | | | | | | | |
| pH | 7.6 | | 8.5 | | 7.2 | | 7.2 | | 7 | |
| Viscosity (centipoise)** | 120 | | 195 | | 10,120 | | 10,600 | | 19,000 | |
| Free Resorcinol (wt. %, LC) | 8.6 | | 8 | | 7.9 | | 8.4 | | 8.4 | |
| | Analysis Results | | | | | | | | | |
| | $^1$H NMR Analysis | | | | | | | | | |
| Aromatic protons/ring | 2.79 | | 2.79 | | 2.92 | | 2.86 | | 2.83 | |
| Methylene bridges/ring | 1.21 | | 1.21 | | 1.08 | | 1.14 | | 1.17 | |
| Formaldehyde/Resorcinol mole ratio | 0.61 | | 0.61 | | 0.54 | | 0.57 | | 0.58 | |
| | IR Analysis | | | | | | | | | |
| Urethane group | Detected | | Detected | | Detected | | Detected | | Detected | |
| Free - NCO structure | None | | None | | None | | None | | None | |

Note:
*The weight % of the MONDUR ® ML charge was based on the resorcinol charge in the RF reaction.
**The viscosity measurements were made using Brookfield viscometer model LV at 23° C. and spindle numbers 2 and 4.

Though the MONDUR® ML content in Example 1-5 was increased from 3 to 10 weight percent, the amount of free resorcinol in the final resin solution remained constant. This suggested that MONDUR® ML might react primarily with the RF resin structure rather than with the free resorcinol present in reaction product.

Example 6

The formulation of the rubber composition (i.e., Example 6) used in the testing and evaluation of resorcinol-resin blocked diisocyanates against the commercially available GRILBOND® IL-6 is shown in Table 3. The Mooney viscosity and Mooney Scorch properties of Example 6 were measured using an Alpha Technologies MV2000 Mooney Viscometer according to ASTM D1646-04 which is incorporated herein by reference. Mooney viscosity is defined as the shearing torque resisting rotation of a cylindrical metal disk (or rotor) embedded in rubber within a cylindrical cavity. The cure properties of Example 6 were measured with an Alpha Technologies MDR2000 Rheometer at 160° C., 0.5° arc and 1.67 Hz according to ASTM D 5289, which is incorporated herein by reference. The samples were cured at 100° C., 125° C. and 160° C., respectively for the Mooney viscosity, Mooney scorch and cure property measurement. The Mooney viscosity, Mooney scorch and cure properties of Example 6 are shown in Table 3 below.

TABLE 3

Rubber Composition and Cure Properties

| Rubber Composition, phr | |
|---|---|
| CV60 Natural Rubber | 70 |
| Styrene-Butadiene Rubber 1502 | 30 |
| N660 Carbon Black | 50 |
| Zinc Oxide | 4 |
| Stearic Acid | 2 |
| Naphthenic Oil | 5 |
| TMQ | 1.8 |
| Sulfur (80%) | 3.13 |
| MBTS | 0.8 |
| Cure Properties (MDR Cure @ 160° C.) | |
| $M_H$, dN-m | 12.43 |
| $M_L$, dN-m | 1.30 |
| $t_s2$, min | 2.08 |
| t' 50, min | 4.02 |
| t' 90, min | 9.22 |
| Cure Rate, dN-m/min | 1.12 |
| Mooney Viscosity, 100° C. | |
| Initial peak | 58.1 |
| ML (1 + 4) | 41.5 |
| Mooney Scorch, 125° C. | |
| Initial peak | 42.4 |
| ML | 30.3 |
| $t_5$ | 17.4 |
| $t_{35}$ | 22.1 |

Comparative Example A, Examples 7A, 7B and 7C

Single-step RFL adhesive dip formulations were prepared from GRILBOND® IL-6 and the RF resin-blocked MONDUR® ML solutions containing different amounts of MONDUR® ML content. The details on the dip formulations are presented in Table 4.

TABLE 4

Resorcinol-Formaldehyde-Latex (RFL) Adhesives
Single-Step Dip Formulation

| | Single-Step Dip Formulation | | | |
|---|---|---|---|---|
| | Comp. Ex. A | Example 7A | Example 7B | Example 7C |
| | | Blocked Isocyanate Used | | |
| | GRILBOND® IL-6 | RF Resin-Blocked MONDUR® ML Solution | | |
| | Control | Example 1 | Example 2 | Example 3 |
| Adhesive Formulation (grams) Part 1 | | | | |
| Water | 105.79 | 113.87 | 113.87 | 112.66 |
| Sodium hydroxide (50%, aqueous) | 1.16 | 0.77 | 0.75 | 0.99 |
| PENACOLITE® Resin R-50 | 15.66 | None | None | None |
| RF-Blocked MONDUR® ML | None | 17.63 | 17.84 | 17.89 |
| Formaldehyde (37%, aqueous) | 3.22 | 3.47 | 3.46 | 3.45 |
| Resin Solution Total | 125.82 | 135.73 | 135.43 | 135 |
| Part 2 | | | | |
| GENTAC® 118 (42.4%, aqueous) | 97.08 | 104.7 | 104.49 | 104.16 |
| Water | 18.86 | 9.57 | 10.08 | 10.85 |
| GRILBOND® IL-6 (50%, aqueous) | 8.25 | None | None | None |
| Total | 250 | 250 | 250 | 250 |
| Properties | | | | |
| Resin Solution, % Solids | 7.6 | 7.7 | 7.8 | 79 |
| Total Solids, % | 22 | 22 | 22 | 22 |
| F/R Mole ratio | 1.21 | 1.21 | 1.21 | 1.21 |
| Measured pH | 9.3 | 9.3 | 9.7 | 9.4 |
| RF Resin + Isocyanate Used | 23.91 | 17.63 | 17.84 | 17.89 |
| Reduction in RF + Isocyanate Used (%) | None | 26.3 | 25.4 | 25.2 |

Note:
R = Resorcinol,
F = Formaldehyde

In Examples 7A, 7B and 7C, RF resin-blocked MONDUR® ML solutions (i.e., Examples 1-3) were used in place of PENACOLITE® R-50 in the single-step dips. In Comparative Example A, GRILBOND® IL-6 was used. In Comparative Example A, Examples 7A, 7B and 7C, the formaldehyde/resorcinol (F/R) ratio was kept constant at 1.21. The total resin and isocyanate level of Examples 7A, 7B and 7C was about 25 weight percent lower than that of Comparative Example A.

Nonadhesive-activated PET cords from KOSA (Cord T-792, 1500×2, 8.25×8.25) were dipped in the single-step formulations listed in Table 4 above (i.e., Comparative Example A, Examples 7A, 7B and 7C), dried and cured in air ovens set under the conditions shown in Table 5 below. These cords were then embedded in the uncured rubber compound having the composition shown in Table 3 above, vulcanized and tested for unaged, steam- and humidity-aged H-pull adhesion per ASTM D4776 method. The results obtained are summarized in Table 5 below.

TABLE 5

Effect of MONDUR® ML Content in RF Resin on Adhesion
(PET Cord T-792 - Nonadhesive-activated from KOSA,
1500x2; 8.25x8.25)
H-Pull Adhesion Results

| | Single-Step Dip Formulation | | | |
|---|---|---|---|---|
| | Comp. Ex. A | Example 7A | Example 7B | Example 7C |
| Adhesion Properties Unaged | | | | |
| No. of Pulls | 15 | 15 | 15 | 15 |
| Rubber Coverage, % | 90 | 50 | 30 | 70 |
| Peak Load, N | 142.2 | 130.9 | 119 | 137 |
| Energy, N-m | 0.81 | 0.71 | 0.62 | 0.72 |
| Steam-Aged, 8 Hrs, 120° C. | | | | |
| No. of Pulls | 10 | 10 | 10 | 10 |
| Rubber Coverage, % | 10 | 5 | 5 | 5 |

TABLE 5-continued

Effect of MONDUR ® ML Content in RF Resin on Adhesion
(PET Cord T-792 - Nonadhesive-activated from KOSA,
1500x2; 8.25x8.25)
H-Pull Adhesion Results

| | Single-Step Dip Formulation | | | |
|---|---|---|---|---|
| | Comp. Ex. A | Example 7A | Example 7B | Example 7C |
| Peak Load, N | 68.5 | 59.2 | 60.4 | 66.3 |
| Energy, N-m | 0.25 | 0.18 | 0.18 | 0.21 |
| Humidity-Aged, 7 Days | | | | |
| No. of Pulls | 10 | 10 | 10 | 10 |
| Rubber Coverage, % | 50 | 10 | 30 | 30 |
| Peak Load, N | 87.1 | 72.3 | 67.3 | 80.4 |
| Energy, N-m | 0.31 | 0.21 | 0.2 | 0.24 |

Note:
* The weight % of the MONDUR ® ML charge was based on the resorcinol charge in the RF reaction. 1st Oven: Temperature (° C.)/sec = 170/20; 2nd Oven: Temperature (° C.)/sec = 230/60. H-Test Conditions: 3/8" mold; cure 160° C./15 min.; Samples assembled in cold mold and cured next day.

From the results in Table 5, it can be seen that, in spite of significant reduction in the total level of the RF resin and isocyanate, the RFL formulations containing the RF resin-blocked MONDUR® ML compositions provided good results in PET cords adhesion.

Example 8

To evaluate the performance of the RFL formulations on dip ageing, single-step dip formulations (i.e., Comparative Example B and Example 8) were prepared, aged for 1 and 6 days, and then used in the treatment on nonadhesive-activated PET cords. The RFL-treated cords were then tested for their unaged H-pull adhesion. The formulations and test results of Comparative Example B and Examples 8 are summarized in Table 6 below.

TABLE 6

Single-Step RFL Formulations and Adhesive Performance
Effect of Dip Ageing on Adhesion
H-Test Results - Unaged Adhesion
(Cord: Non-adhesive activated PET cord from Trevira, 1000/2, 12x12)

| | Single-Step Dip Formulation | |
|---|---|---|
| | Comp. Ex. B | Example 8 |
| | Blocked Isocyanate Used: | |
| Adhesive Formulation (grams) | GRILBOND ® IL 6 Control | RF-MONDUR ® ML Example 3 |
| Part 1: | | |
| Water | 169.26 | 180.26 |
| Sodium hydroxide (50%, aqueous) | 1.85 | 1.59 |
| Penacolite ® R-50 | 25.05 | None |
| RF-Blocked Mondur ® ML | None | 29.04 |
| Formaldehyde (37%, aqueous) | 5.15 | 5.52 |
| Resin Solution Total | 201.31 | 216.41 |
| Part: 2 | | |
| Gentac ® 118 (42.4%, aqueous) | 155.32 | 166.65 |
| Water | 16.97 | 17.6 |

TABLE 6-continued

Single-Step RFL Formulations and Adhesive Performance
Effect of Dip Ageing on Adhesion
H-Test Results - Unaged Adhesion
(Cord: Non-adhesive activated PET cord from Trevira, 1000/2, 12x12)

| | Single-Step Dip Formulation | | | |
|---|---|---|---|---|
| | Comp. Ex. B | | Example 8 | |
| | Blocked Isocyanate Used: | | | |
| Adhesive Formulation (grams) | GRILBOND ® IL 6 Control | | RF-MONDUR ® ML Example 3 | |
| Grilbond ® IL-6 (50%, aqueous) | 26.41 | | None | |
| Total | 400 | | 400.66 | |
| RF Resin + Isocyanate Used | 51.46 | | 29.04 | |
| Dip Ageing (days) | 1 | 4 | 1 | 4 |
| Unaged Adhesion | | | | |
| No. of Pulls | 15 | 10 | 15 | 10 |
| Peak Load, N | 127.9 | 130.2 | 136.5 | 139.4 |
| Rubber Coverage, % | 90 | 90 | 80 | 90 |
| Energy, N-m | 0.81 | 0.93 | 0.88 | 1.01 |

The data in Table 6 indicate that Example 8 has higher H-pullout force and energy values than Comparative Example B.

Example 9

The effect of adhesive treating temperatures on H-pull adhesion was evaluated for the RFLs containing GRIL-BOND® IL-6 (i.e., Comparative Example C) or RF-blocked MONDUR® ML (i.e., Example 9). The drying oven temperature was kept at 170° C. and the adhesive treating oven temperatures were varied between 174 and 230° C. Trevira and KOSA nonadhesive-activated PET cords were dipped into Comparative Example C and Example 9 and used in the adhesive performance evaluations. The results are presented in Table 7.

TABLE 7

Effect of Treating Temperatures on H-Pull Adhesion.
Drying Oven Temperature, 170° C.

|  | Comp. Ex. C | | | | Example 9 | | | |
|---|---|---|---|---|---|---|---|---|
| RFL Formulation Contains: | | | | | | | | |
|  | Grilbond ® IL 6 | | | | Example 3 | | | |
| Total RF Resin + Isocyanate Content: | | | | | | | | |
|  | 51.46 parts | | | | 28.62 parts | | | |
| Treating or Curing Temperature (° C.): | | | | | | | | |
|  | 174 | 191 | 213 | 230 | 174 | 191 | 213 | 230 |
| | Unaged | | | | Aged Adhesion | | | |
| Trevira PET Cords (1000x2; 12x12) | | | | | | | | |
| Peak Load, N | 73.3 | 75.9 | 113.9 | 110.9 | 64.8 | 69.2 | 104.6 | 127.4 |
| Energy, N-m | 0.34 | 0.4 | 0.72 | 0.67 | 0.26 | 0.33 | 0.65 | 0.84 |
| Broken Cords, % | 0 | 0 | 0 | 0 | 0 | 0 | 0 | 0 |
| KOSA PET Cords (1500x2; 10x10) | | | | | | | | |
| Peak Load, N | 85.2 | 108.5 | 135.9 | 147.5 | 93.1 | 101.7 | 133.8 | 156.4 |
| Energy, N-m | 0.44 | 0.68 | 0.96 | 1.06 | 0.5 | 0.6 | 0.99 | 1.11 |
| Broken Cords, % | 0 | 0 | 0 | 0 | 0 | 0 | 0 | 0 |

At higher treating temperatures, Example 9 produced significantly higher adhesion than Comparative Example C. With the reduction in the total level of RF resin and isocyanate used in the RFL formulations, there could be a potential cost savings associated with RF-blocked MONDUR® ML solutions.

Example 10

The single-step dip adhesive performance in the nonadhesive-activated PET cords was also evaluated. The results are presented in Table 8.

TABLE 8

Single-Step Dip Adhesion Performance with RF-Blocked
Mondur ® ML Solution
H-Pull Results - Unaged Adhesion
(Non-adhesive-activated PET cords from KOSA, 1500x2, 10x10)

|  | Single-step Dip Adhesive Formulation | |
|---|---|---|
|  | Comp. Ex. D | Example 10 |
| Dip Formulation Contains: | | |
|  | Grilbond IL-6 | Example 4 |
| Blocked Isocyanate Used: | | |
|  | Caprolactam-MDI | RF-Blocked Mondur ® ML |
| Drying/Cure Conditions | | |
| 1st Oven: Temperature (° C.)/sec | 170/120 | 170/120 |
| 2nd Oven: Temperature (° C.)/Sec | 230/60 | 230/60 |
| Undesiccated Test Cord, nonadhesive-activated PET cord | | |
| Peak Load, N | 126.9 | 127.6 |
| Energy, N-m | 0.91 | 0.94 |
| Rubber Coverage, % | 85 | 80 |

TABLE 8-continued

Single-Step Dip Adhesion Performance with RF-Blocked
Mondur ® ML Solution
H-Pull Results - Unaged Adhesion
(Non-adhesive-activated PET cords from KOSA, 1500x2, 10x10)

|  | Single-step Dip Adhesive Formulation | |
|---|---|---|
|  | Comp. Ex. D | Example 10 |
| Dip Formulation Contains: | | |
|  | Grilbond IL-6 | Example 4 |
| Blocked Isocyanate Used: | | |
|  | Caprolactam-MDI | RF-Blocked Mondur ® ML |
| Desiccated Test Cord, nonadhesive-activated PET cord | | |
| Peak Load, N | 150.4 | 166 |
| Energy, N-m | 1.12 | 1.25 |
| Rubber Coverage, % | 90 | 80* |

Note:
*Some filament breakage.

When tested in nonadhesive-activated PET cords, the adhesion values were significantly better for modified RF resin-containing dip formulations.

Example 11

The effect of RFL dip solids on the adhesion performance was also determined. In this study, the adhesive-activated PET cords were used and the RFL dip solid contents were varied between 16 and 22 weight percent. PENACOLITE® R-50 resin was used in the control formulation. Strap peel and H-pull adhesion measurements were made, and the results are presented in Table 9.

TABLE 9

Effect of RFL Dip Solids on Unaged PET Cord Adhesion
Single-Step RFL Dip Formulations Used
(PET Cord: Adhesive-activated from KOSA, 1500x2; 10x10)

| | Single-step Dip Adhesive Formulation | | | | | | | |
|---|---|---|---|---|---|---|---|---|
| | Comp. Ex. E | | | | Example 11 | | | |
| | RFL Formulation Contains: | | | | | | | |
| | Grilbond ® IL 6 | | | | RF-Blocked Mondur ® ML (Example 4) | | | |
| | Total Solids in RFL, % | | | | | | | |
| | 22 | 20 | 18 | 16 | 22 | 20 | 18 | 16 |
| | PET Cord Dip Pickup*, % | | | | | | | |
| | 6.8 | 6.5 | 5.5 | 4.9 | 7.8 | 6.6 | 5.4 | 4.9 |
| | Adhesion Property | | | | | | | |
| | Strap Peel Adhesion | | | | | | | |
| Peel Strength, N/mm | 8.9 | 9.9 | 9.3 | 8.7 | 9.8 | 10.4 | 10.3 | 9.3 |
| Total Energy, N-m | 22.54 | 24.39 | 22.4 | 21.49 | 24.89 | 25.3 | 25.56 | 22.69 |
| Rubber Coverage, % | 90 | 95 | 90 | 90 | 100 | 100 | 95 | 95 |
| | H-Pull Adhesion | | | | | | | |
| Peak Load, N | 162.9 | 159.5 | 154.2 | 142.8 | 180 | 169.9 | 163.8 | 152.4 |
| Energy, N-m | 1.2 | 1.18 | 1.15 | 0.95 | 1.38 | 1.29 | 1.22 | 1.09 |
| Rubber Coverage, % | 85 | 90 | 80 | 80 | 90 | 90 | 80 | 80 |

Note:
*wet chemical method.

When compared to Comparative Example E, Example 11 produced about 5 to 10% greater adhesion values. Since the adhesion values were higher, the total solids content of RFL containing RF-Blocked MONDUR® ML could be reduced to maintain adhesion values similar to the control adhesive dip. This could result in potential cost savings in RFL formulations containing the resin solutions of this invention.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. The method of making the flame retardants may be described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A resorcinol resin-blocked isocyanate composition comprising:

(a) a first compound having Formula (VI'):

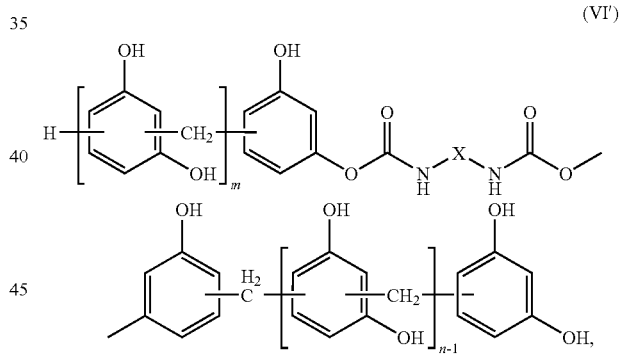

(b) a second compound having Formula (VII'):

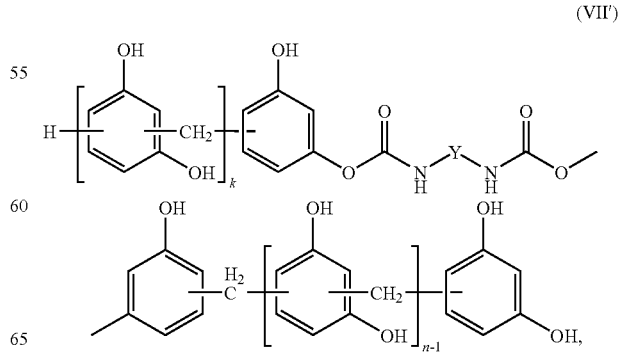

wherein the ratio of Formula (VI') to Formula (VII') is between about 25:75 and about 75:25, and wherein X and Y are different and each of X and Y comprises independently alkylene, cycloalkylene, arylene, cycloalkarylene, alkarylene, aralkylene, heterocyclylene, heteroarylene or a combination thereof; each of n, m and k is independently a distribution of integers having an average from about 1 to about 100; each of Formulae (VI') and (VII') is unsubstituted or independently substituted with one or more substituents, and the one or more substituents are alkyl, aryl, alkaryl, cycloalkaryl, aralkyl, alkenyl, siloxanyl, alkynyl, acyl, carboxy, heterocyclyl, halide, nitro, hydroxy, unsubstituted or substituted methacrylate, unsubstituted or substituted acrylate, silyl ether, or a combination thereof.

2. The resorcinol resin-blocked isocyanate composition of claim 1, wherein each of X and Y is independently a divalent radical having one of the following formulae:

(A)

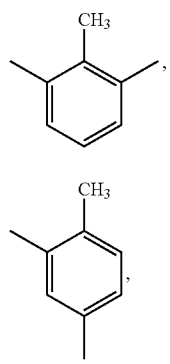

(B)

(C)

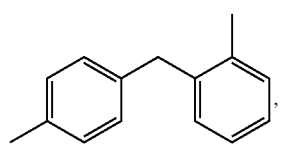

(D)

(E)

(F)

(G)

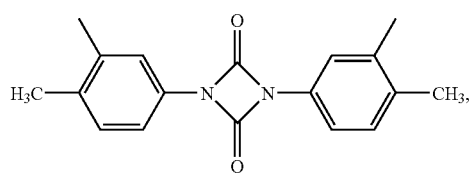

-continued (H)

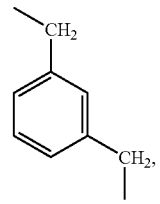

(I)

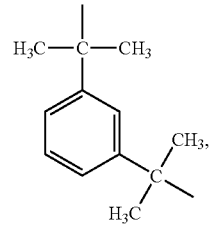

(J)

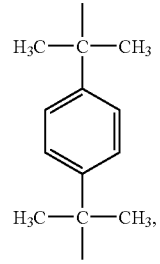

(K)

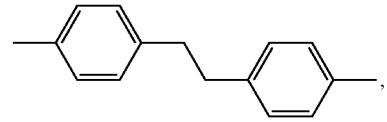

(L)

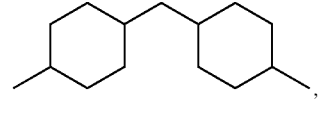

(M)

(N)

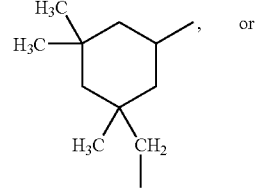

or (O)

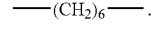

—(CH$_2$)$_6$—.

3. The resorcinol resin-blocked isocyanate composition of claim 1 further comprising a third compound having Formula (VIII'):

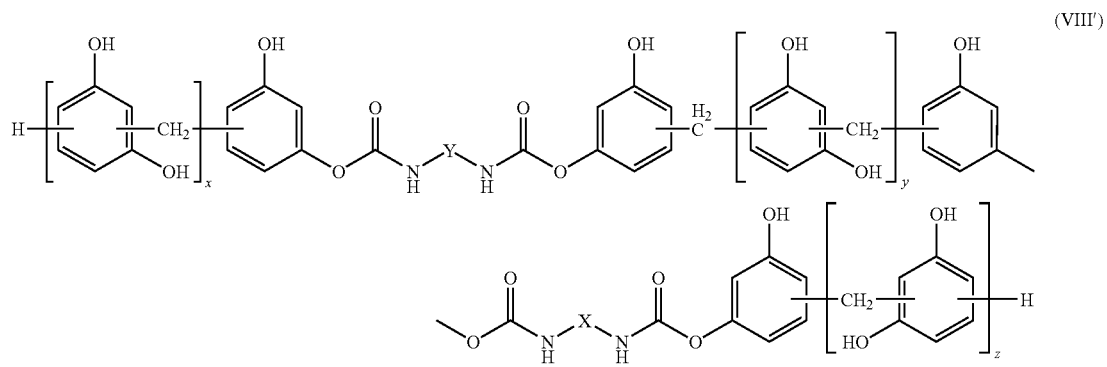

(VIII')

wherein X and Y are different and each of X and Y comprises independently alkylene, cycloalkylene, arylene, cycloalkarylene, alkarylene, aralkylene, heterocyclylene, heteroarylene or a combination thereof; each of x, y and z is independently a distribution of integers having an average from about 1 to about 100; Formulae (VII') is unsubstituted or independently substituted with one or more substituents, and the one or more substituents are alkyl, aryl, alkaryl, cycloalkaryl, aralkyl, alkenyl, siloxanyl, alkynyl, acyl, carboxy, heterocyclyl, halide, nitro, hydroxy, unsubstituted or substituted methacrylate, unsubstituted or substituted acrylate, silyl ether, or a combination thereof.

4. A resorcinol resin-blocked isocyanate composition obtainable from the reaction between at least two different isocyanate compounds and a resorcinol resin, wherein the mole ratio of the two different isocyanate compounds is between about 75:25 and about 25:75, and wherein each of the at least two different isocyanate compound is independently a diisocyanate, a triisocyanate or a higher polyisocyanate.

5. The resorcinol resin-blocked isocyanate composition of claim 4, wherein the resorcinol resin has Formula (V), Formula (V') or a combination thereof:

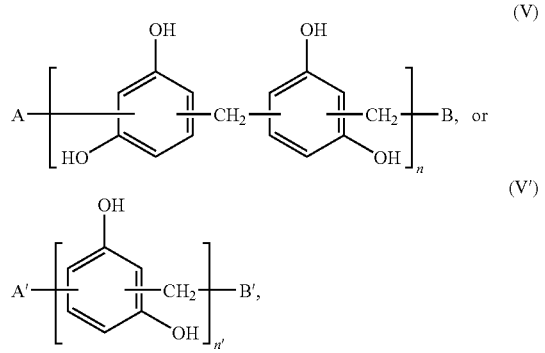

wherein each of n and n' is a distribution of integers having an average from about 1 to about 100; each of A, B, A' and B' is independently an end group; the phenyl rings of Formula (V) or (V') are unsubstituted or substituted with at least one substituent including alkyl, aryl, alkaryl, cycloalkaryl, aralkyl, alkenyl, alkynyl, acyl, carboxy, heterocyclyl, halide, nitro, or hydroxy; and the methylene groups of Formula (V) or (V') are unsubstituted or substituted with one or two substituents including alkyl, aryl, alkaryl, cycloalkaryl, aralkyl, alkenyl, alkynyl, or heterocyclyl.

6. The resorcinol resin-blocked isocyanate composition of claim 5, wherein each of A, B, A' and B' is independently H, Formula (V-1) or Formula (V-2):

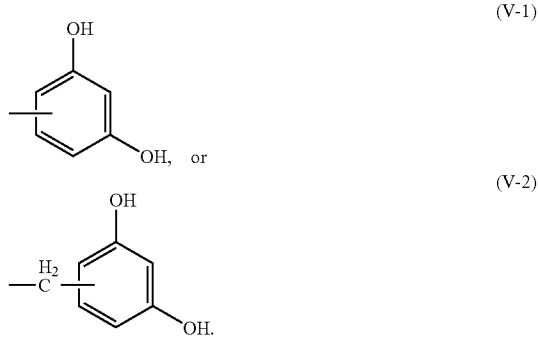

7. The resorcinol resin-blocked isocyanate composition of claim 4, wherein the at least two isocyanate compounds have the formulae O=C=N—X—N=C=O and O=C=N—Y—N=C=O wherein X and Y are different and each of X and Y comprises independently alkylene, cycloalkylene, arylene, alkarylene, cycloalkarylene, aralkylene, heterocyclylene, heteroarylene or a combination thereof.

8. A process for preparing a resorcinol resin-blocked isocyanate composition comprising reacting at least two different isocyanate compounds with a resorcinol resin, wherein the mole ratio of the two different isocyanate compounds is between about 75:25 and about 25:75, and wherein each of the at least two different isocyanate compound is independently a diisocyanate, a triisocyanate or a higher polyisocyanat.

9. The process of claim 8, wherein the resorcinol resin has Formula (V), Formula (V') or a combination thereof:

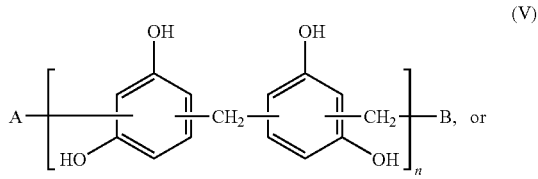

-continued

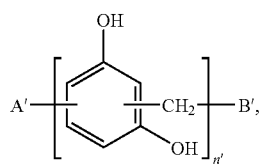
(V')

wherein each of n and n' is a distribution of integers having an average from about 1 to about 100; each of A, B, A' and B' is independently an end group; the phenyl rings of Formula (V) or (V') are unsubstituted or substituted with at least one substituent including alkyl, aryl, alkaryl, cycloalkaryl, aralkyl, alkenyl, alkynyl, acyl, carboxy, heterocyclyl, halide, nitro, or hydroxy; and the methylene groups of Formula (V) or (V') are unsubstituted or substituted with one or two substituents including alkyl, aryl, alkaryl, cycloalkaryl, aralkyl, alkenyl, alkynyl, or heterocyclyl.

10. The process of claim 9, wherein each of A, B, A' and B' is independently H, Formula (V-1), or Formula (V-2):

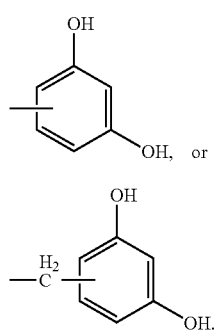
(V-1)

(V-2)

11. The process of claim 8, wherein the reaction occurs in the absence of a solvent.

12. The process of claim 8, wherein the reaction occurs in the presence of a catalyst.

13. The process of claim 12, wherein the catalyst is 3-methyl-1-phenyl-2-phospholene-1-oxide or dibutyltin dilaurate.

14. The process of claim 8, wherein the reaction occurs in the absence of a catalyst.

15. The process of claim 8, wherein the at least two isocyanate compounds have the formulae O=C=N—X—N=C=O and O=C=N—Y—N=C=O wherein X and Y are different and each of X and Y comprises independently alkylene, cycloalkylene, arylene, alkarylene, cycloalkarylene, aralkylene, heterocyclylene, heteroarylene or a combination thereof.

16. The process of claim 15, wherein each of X and Y is independently a divalent radical having one of the following formulae:

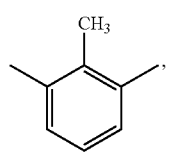
(A)

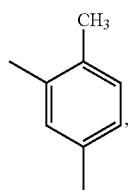
(B)

(C)

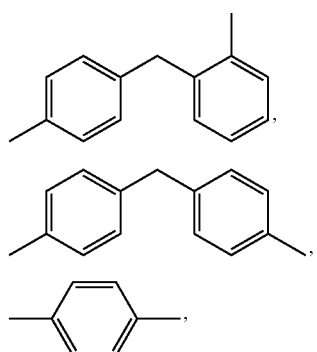
(D)

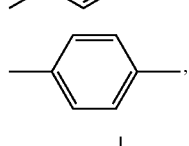
(E)

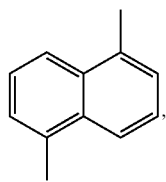
(F)

(G)

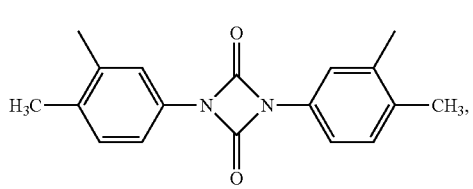
(H)

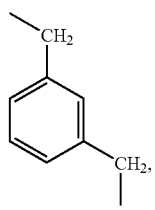
(I)

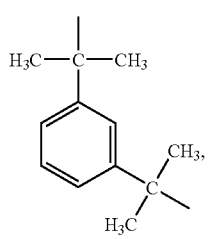
(J)

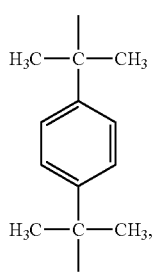

-continued

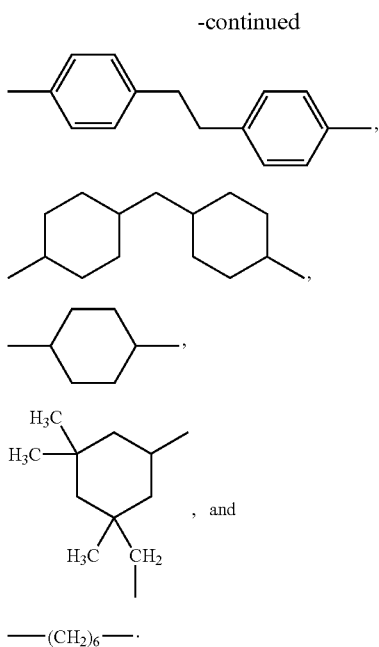

(K)

(L)

(M)

(N)

(O)

17. A vulcanizable rubber composition comprising or obtainable from a mixture comprising a rubber material, a methylene donor and a methylene acceptor comprising the resorcinol resin-blocked isocyanate composition of claim 1.

18. The vulcanizable rubber composition of claim 17, wherein the rubber material is a natural or synthetic rubber.

19. The vulcanizable rubber composition of claim 17 further comprising a rubber reinforcement material.

20. The vulcanizable rubber composition of claim 19, wherein the rubber reinforcement material is in the form of fibers, filaments, fabrics or cords.

21. The vulcanizable rubber composition of claim 19, wherein the rubber reinforcing material is made of a polyester, a polyamide, carbon, glass, steel, polybenzoxazole or rayon.

22. The vulcanizable rubber composition of claim 21, wherein the reinforcing material is steel.

23. The vulcanizable rubber composition of claim 17 further comprising a vulcanizing agent.

24. The vulcanizable rubber composition of claim 17 further comprising at least an additive, wherein the additive is carbon black, zinc oxide, silica, an antioxidant, a stearate, an accelerator, an adhesion promoter, a cobalt salt, stearic acid, a filler, a plasticizer, a wax, a processing oil, a retarder, an antiozonant or a combination thereof.

25. A dipping formulation comprising the resorcinol resin-blocked isocyanate composition of claim 1.

26. The dipping formulation of claim 25 further comprising a solvent.

27. The dipping formulation of claim 25 further comprising an additive.

28. A dipping formulation comprising a resorcinol resin-blocked isocyanate composition and an additive, wherein the additive is an epoxy-containing compound, a thickener, an antifoam or a combination thereof, and wherein the resorcinol resin-blocked isocyanate composition comprising:

(a) a first compound having Formula (VI'):

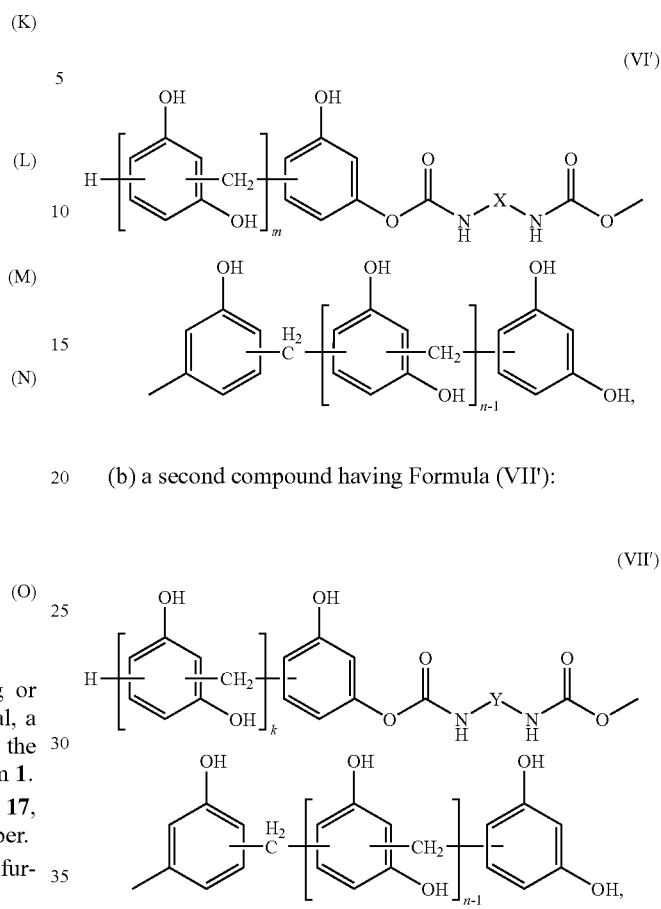

(VI')

(b) a second compound having Formula (VII'):

(VII')

wherein X and Y are different and each of X and Y comprises independently alkylene, cycloalkylene, arylene, cycloalkarylene, alkarylene, aralkylene, heterocyclylene, heteroarylene or a combination thereof; each of n, m and k is independently a distribution of integers having an average from about 1 to about 100; each of Formulae (VI') and (VII') is unsubstituted or independently substituted with one or more substituents, and the one or more substituents are alkyl, aryl, alkaryl, cycloalkaryl, aralkyl, alkenyl, siloxanyl, alkynyl, acyl, carboxy, heterocyclyl, halide, nitro, hydroxy, unsubstituted or substituted methacrylate, unsubstituted or substituted acrylate, silyl ether, or a combination thereof.

29. A dipping formulation comprising a resorcinol resin-blocked isocyanate composition and a poly(vinyl pyridine/butadiene/styrene) latex, wherein the resorcinol resin-blocked isocyanate composition comprising:

(a) a first compound having Formula (VI'):

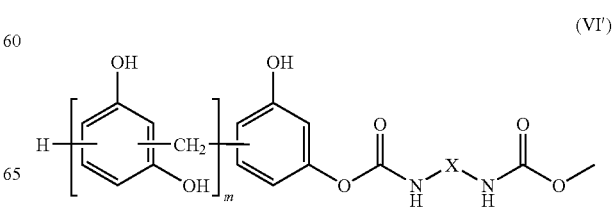

(VI')

-continued

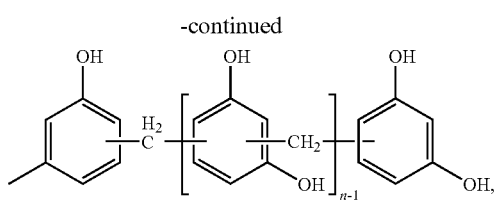

(b) a second compound having Formula (VII'):

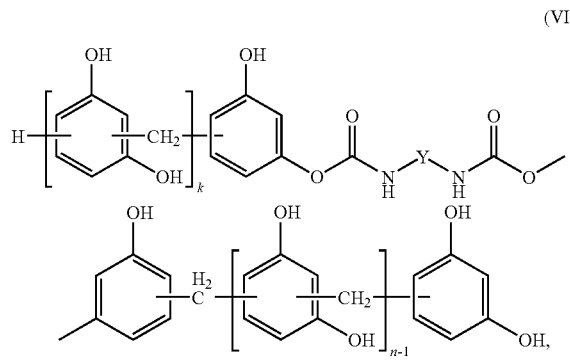

wherein X and Y are different and each of X and Y comprises independently alkylene, cycloalkylene, arylene, cycloalkarylene, alkarylene, aralkylene, heterocyclylene, heteroarylene or a combination thereof; each of n, m and k is independently a distribution of integers having an average from about 1 to about 100; each of Formulae (VI') and (VII') is unsubstituted or independently substituted with one or more substituents, and the one or more substituents are alkyl, aryl, alkaryl, cycloalkaryl, aralkyl, alkenyl, siloxanyl, alkynyl, acyl, carboxy, heterocyclyl, halide, nitro, hydroxy, unsubstituted or substituted methacrylate, unsubstituted or substituted acrylate, silyl ether, or a combination thereof.

30. A dipping formulation comprising a resorcinol resin-blocked isocyanate composition and a resin solution, wherein the resorcinol resin-blocked isocyanate composition comprising:

(a) a first compound having Formula (VI'):

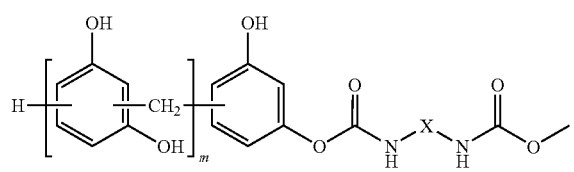

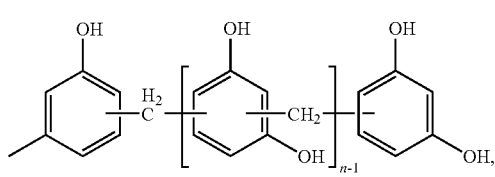

(b) a second compound having Formula (VII'):

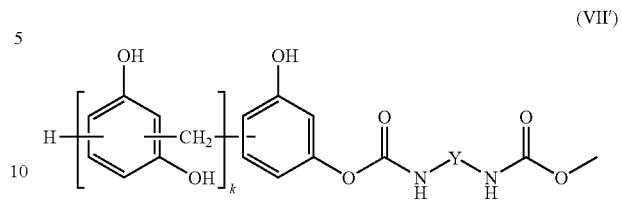

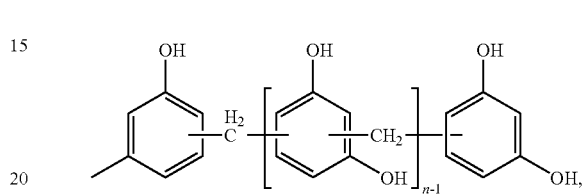

wherein X and Y are different and each of X and Y comprises independently alkylene, cycloalkylene, arylene, cycloalkarylene, alkarylene, aralkylene, heterocyclylene, heteroarylene or a combination thereof; each of n, m and k is independently a distribution of integers having an average from about 1 to about 100; each of Formulae (VI') and (VII') is unsubstituted or independently substituted with one or more substituents, and the one or more substituents are alkyl, aryl, alkaryl, cycloalkaryl, aralkyl, alkenyl, siloxanyl, alkynyl, acyl, carboxy, heterocyclyl, halide, nitro, hydroxy, unsubstituted or substituted methacrylate, unsubstituted or substituted acrylate, silyl ether, or a combination thereof.

31. The dipping formulation of claim 30, wherein the resin solution is a resorcinol-formaldehyde solution.

32. The dipping formulation of claim 31 further comprising an additive.

33. The dipping formulation of claim 32, wherein the additive is an antifoam.

34. A fabricated article comprising a rubber material and a rubber reinforcing material treated with the dipping formulation of claim 25.

35. The fabricated article of claim 34, wherein the rubber material is a natural or synthetic rubber.

36. The fabricated article of claim 34, wherein the rubber reinforcing material is in the form of fibers, filaments, fabrics or cords.

37. The fabricated article of claim 34, wherein the rubber reinforcing material is made of a polyester, a polyamide, carbon, glass, steel, a polybenzoxazole or rayon.

38. The fabricated article of claim 34, wherein the fabricated article is a tire, power transmission belt, conveyor belt, V-belt, hose printing roll, rubber shoe heel, rubber shoe sole, automobile floor mat, truck mud flap or ball mill liner.

39. A coating comprising a resin prepared by curing Formula (B), (B'), (C) or a combination thereof:

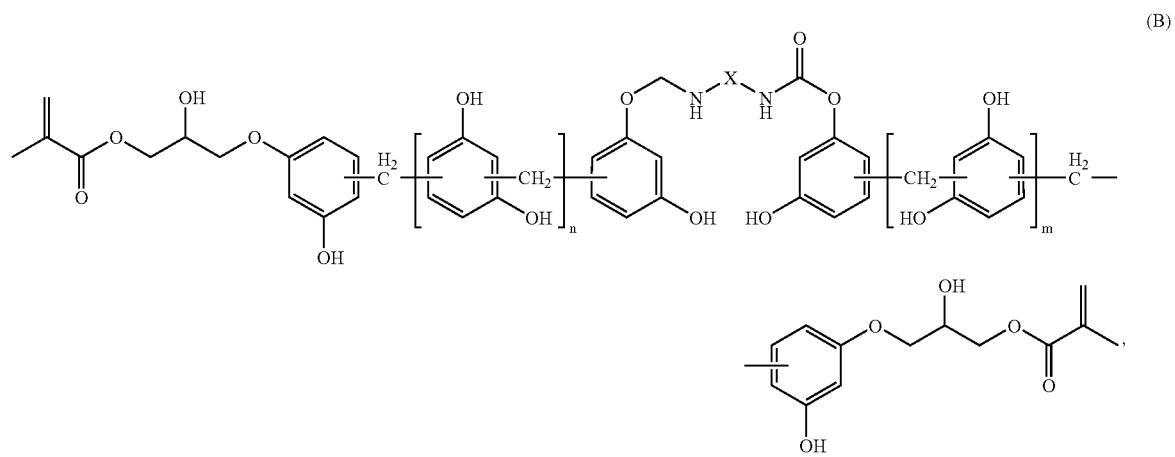
(B)
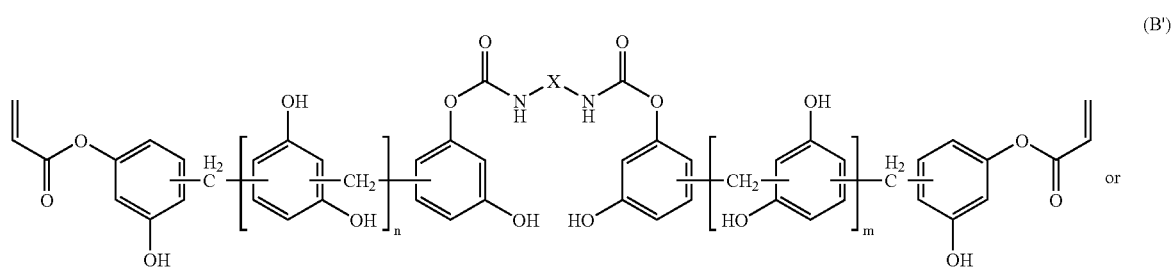
(B')
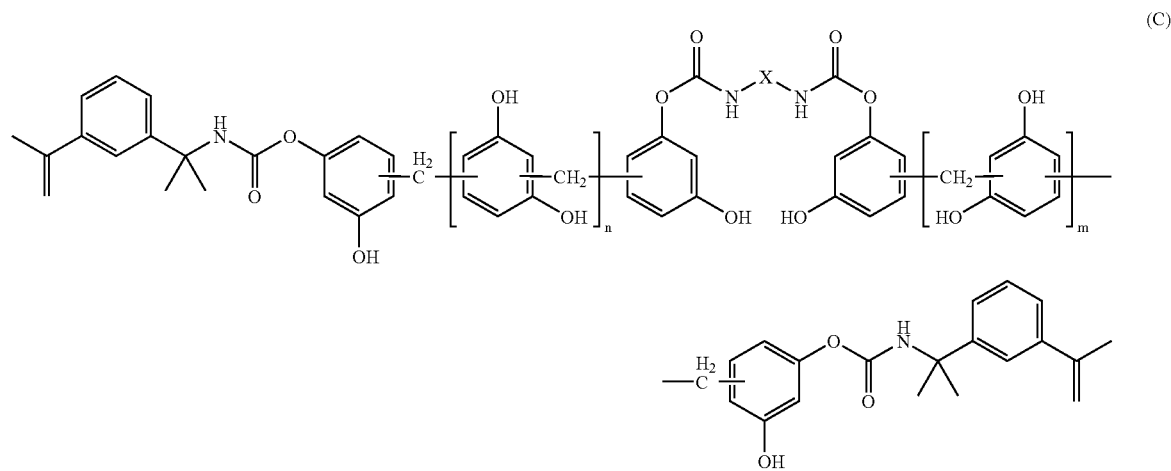
(C)

by heat, radiation or a combination thereof, wherein X is an alkylene, cycloalkylene, arylene, alkarylene, cycloalkarylene, aralkylene, heterocyclylene or a combination thereof; and each of n and m is a distribution of integers having an average from about 1 to about 100.

40. The coating of claim 39, wherein the curing occurs in the presence of an initiator.

41. The coating of claim 40 further comprising an additive.

42. The coating of claim 41, wherein the additive is a filler, rheology modifier, thickener, surfactant, wetting agent, cross-linking agent, coupling agent, colorant, lubricant, leveling agent, antioxidant, UV stabilizer, plasticizer or a combination thereof.

43. A coating comprising a resin prepared by curing Formula (B), (D) or a combination thereof:

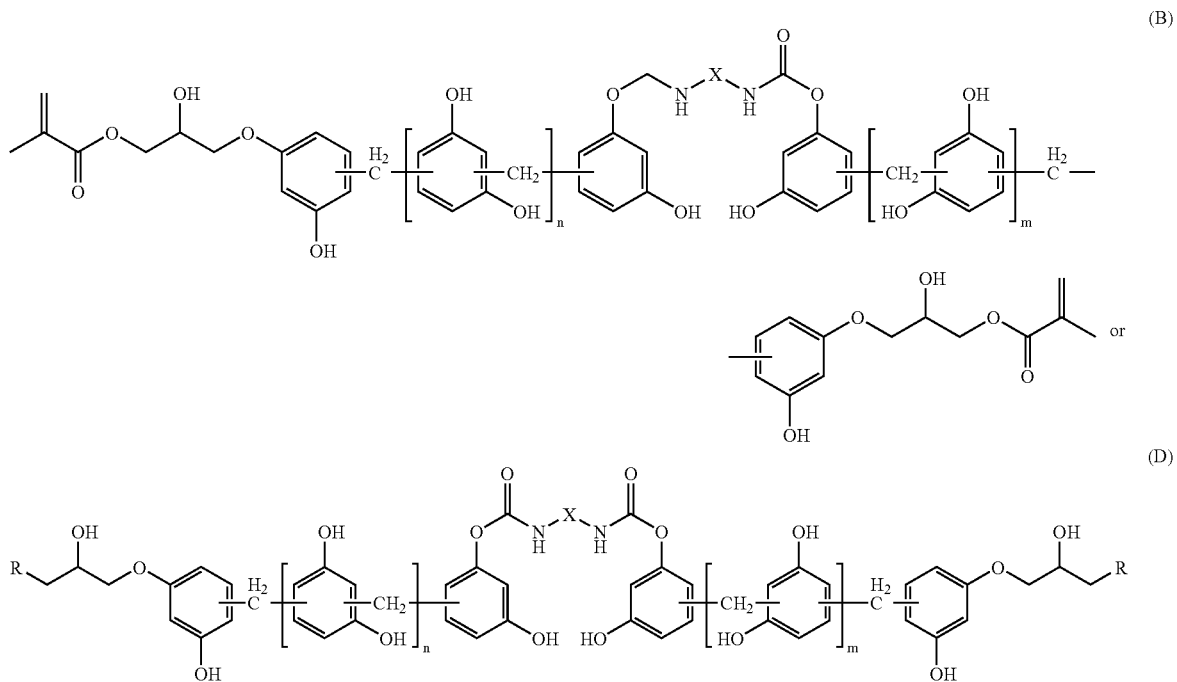

with a diisocyante, a polyisocyanate or a combination thereof, wherein X is an alkylene, cycloalkylene, arylene, alkarylene, cycloalkarylene, aralkylene, heterocyclylene or a combination thereof; and R is alkyl, aryl, aralkyl, siloxanyl, silyl ether or a combination thereof; and each of n and m is a distribution of integers having an average from about 1 to about 100.

44. The coating of claim 43 further comprising an additive.

45. The coating of claim 44, wherein the additive is a filler, rheology modifier, thickener, surfactant, wetting agent, cross-linking agent, coupling agent, colorant, lubricant, leveling agent, antioxidant, UV stabilizer, plasticizer or a combination thereof.

* * * * *